US012657042B2

(12) United States Patent
Rutkowski, Jr. et al.

(10) Patent No.: US 12,657,042 B2
(45) Date of Patent: Jun. 16, 2026

(54) SYSTEMS AND METHODS FOR IMPROVED GRAPHICAL USER INTERFACES BASED ON CONTEXTUAL INFORMATION

(71) Applicant: Expedia, Inc., Seattle, WA (US)

(72) Inventors: Andrew Rutkowski, Jr., San Antonio, TX (US); Divakar Gupta, New Delhi (IN); Lucy Swithenby, Austin, TX (US); Anuj Jain, Gurgaon (IN); Smita Mittal Salem, New Delhi (IN)

(73) Assignee: Expedia, Inc., Seattle, WA (US)

( * ) Notice: Subject to any disclaimer, the term of this patent is extended or adjusted under 35 U.S.C. 154(b) by 173 days.

(21) Appl. No.: 18/499,810

(22) Filed: Nov. 1, 2023

(65) Prior Publication Data

US 2024/0143353 A1      May 2, 2024

(30) Foreign Application Priority Data

Nov. 2, 2022    (IN) .............................. 202241062685

(51) Int. Cl.
G06F 9/451          (2018.01)
G06F 3/0481        (2022.01)

(52) U.S. Cl.
CPC ............ G06F 9/451 (2018.02); G06F 3/0481 (2013.01)

(58) Field of Classification Search
CPC ................................ G06F 9/451; G06F 3/0481
See application file for complete search history.

(56) References Cited

U.S. PATENT DOCUMENTS

D676,861 S       2/2013  Ho Kushner et al.
D716,338 S      10/2014  Lee
D718,783 S      12/2014  Inose et al.
D746,866 S       1/2016  Memoria et al.
D751,593 S       3/2016  Gardner et al.
D776,692 S       1/2017  Armstrong
D785,028 S       4/2017  Federighi et al.
            (Continued)

FOREIGN PATENT DOCUMENTS

EM       015019910-0001        5/2023

OTHER PUBLICATIONS

Booking Holdings Inc. Booking.com Mobile Application Jun. 2020 (Year: 2020).*
            (Continued)

*Primary Examiner* — Cao H Nguyen
(74) *Attorney, Agent, or Firm* — Foley & Lardner LLP

(57)          ABSTRACT
Systems and methods for providing improved graphical user interfaces are disclosed. A method includes: receiving experience information associated with an experience; evaluating the experience information based on contextual information associated with the experience; determining a priority of the experience information based on the evaluation; retrieving a digital object template from a limited number of digital object templates based on the determined priority of the experience information; populating the retrieved digital object template with corresponding experience information to generate a contextual digital interface object; and providing the contextual digital interface object on a graphical user interface of a user device, the contextual digital interface object comprising a selectable feature based on the corresponding experience information.

20 Claims, 8 Drawing Sheets

(56) References Cited

U.S. PATENT DOCUMENTS

| | | | |
|---|---|---|---|
| D790,560 | S | 6/2017 | Inose et al. |
| D793,424 | S | 8/2017 | Bao et al. |
| D816,110 | S | 4/2018 | Choi et al. |
| D828,384 | S | 9/2018 | Nilsson et al. |
| D829,219 | S | 9/2018 | Bae et al. |
| D835,152 | S | 12/2018 | Mcgill et al. |
| D837,230 | S | 1/2019 | Johnston et al. |
| D848,458 | S | 5/2019 | Rocha et al. |
| D851,654 | S | 6/2019 | Bae et al. |
| D855,067 | S | 7/2019 | Campbell et al. |
| D872,118 | S | 1/2020 | Byun et al. |
| D874,484 | S | 2/2020 | Gaiser et al. |
| D875,743 | S | 2/2020 | Cielak et al. |
| D887,424 | S | 6/2020 | Fukushima et al. |
| D890,189 | S | 7/2020 | Shacham et al. |
| D910,697 | S | 2/2021 | Lemay et al. |
| D911,382 | S | 2/2021 | Devine et al. |
| D916,789 | S | 4/2021 | Borochoff et al. |
| D917,518 | S | 4/2021 | Lunaparra et al. |
| D918,938 | S | 5/2021 | Patel et al. |
| D922,399 | S | 6/2021 | Desai et al. |
| D928,813 | S | 8/2021 | Nurutdinov et al. |
| D933,672 | S | 10/2021 | Bambao et al. |
| D934,902 | S | 11/2021 | Devine |
| 11,188,215 | B1 | 11/2021 | Holland |
| D938,991 | S | 12/2021 | Song et al. |
| D940,170 | S | 1/2022 | Yokomoto |
| D940,735 | S | 1/2022 | Gouliard et al. |
| D944,274 | S | 2/2022 | Domm et al. |
| D957,417 | S | 7/2022 | Johnston et al. |
| D966,282 | S | 10/2022 | Soccorsy et al. |
| D967,150 | S | 10/2022 | Xu et al. |
| D976,933 | S | 1/2023 | Johnston et al. |
| D983,808 | S | 4/2023 | Norman |
| D983,818 | S | 4/2023 | He et al. |
| D1,011,371 | S | 1/2024 | Leon Guerrero et al. |
| D1,012,097 | S | 1/2024 | Leon Guerrero et al. |
| D1,012,946 | S | 1/2024 | Li et al. |
| D1,034,631 | S | 7/2024 | Sabour et al. |
| D1,044,853 | S | 10/2024 | Epstein |
| D1,054,438 | S | 12/2024 | Mederos et al. |
| D1,060,414 | S | 2/2025 | Purohit |
| D1,061,579 | S | 2/2025 | Christie et al. |
| D1,062,769 | S | 2/2025 | Cordova et al. |
| D1,069,827 | S | 4/2025 | Norman |
| D1,069,833 | S | 4/2025 | Borochoff et al. |
| D1,070,893 | S | 4/2025 | Kokuta et al. |
| D1,073,692 | S | 5/2025 | Foss et al. |
| D1,074,695 | S | 5/2025 | Soccorsy et al. |
| D1,075,798 | S | 5/2025 | Fu et al. |
| D1,075,834 | S | 5/2025 | Ko et al. |
| D1,076,930 | S | 5/2025 | Cai |
| D1,102,449 | S | 11/2025 | Oh et al. |
| 2016/0117091 | A1* | 4/2016 | Bang ..................... G06F 3/0483 |
| | | | 715/799 |
| 2016/0162172 | A1* | 6/2016 | Rathod ................. G06F 3/0481 |
| | | | 715/747 |
| 2017/0242899 | A1 | 8/2017 | Jolley et al. |
| 2018/0126248 | A1 | 5/2018 | Dion et al. |
| 2022/0012072 | A1* | 1/2022 | Barnett ............... G06F 16/9577 |
| 2023/0176711 | A1 | 6/2023 | Leon Guerrero et al. |
| 2024/0143353 | A1 | 5/2024 | Rutkowski et al. |

OTHER PUBLICATIONS

Aggarwal, Shanal, How much does vacation rental applike Airbnb development cost, Jan. 29, 2020, techaheadcorp.com, retrieved Jan. 14, 2025, https://www.techaheadcorp.com/blog/airbnb-like-app-development-cost/ (Year: 2020).
Bootstrap 4 horizontal scroll, Sep. 27, 2021, codepen.io, retrieved Jan. 14, 2025, https://codepen.io/Temmio/pen/gKGEYV (Year: 2021).
Goyal, Ramit, Here's how we built a truly personalised app experience, Dec. 31, 2017, makemytrip.com, retrieved Jan. 14, 2025, https://tech. makemytrip.com/heres-how-we-built-a-truly-personalised-app-experience-makemytrip-live-it-316011071900 (Year : 2017).
How to create a movie slider effect, Mar. 10, 2022, YouTube.com, retrieved Jan. 14, 2025, https://www.youtube.com/watch?v= k5HantSabtw (Year: 2022).
Remittance IOS app design app ui kit, Apr. 1, 2019, dribbble.com, retrieved Jan. 14, 2025, https://dribbble.com/shots/6268336- Remit-tance-I OS-app-design-app-ui-kit?utm_source= Pinterest_Shot&utm_ cam paign=shouravchyl&utm_content= R . . . (Year: 2019).
Swipe gestures for Delete in iPad OS Mail, Apr. 24, 2022, YouTube. com, retrieved Jan. 14, 2025, https:// discussions.apple.com/thread/ 253846422?sortBy=rank (Year: 2022).
Thinking on ways to solve a media scroller, May 12, 2021, YouTube.com, retrieved Jan. 14, 2025, https://www.youtube.com/ watch?v=jmLdZY_Lo1k (Year: 2021).
Airbnb, Inc.—Airbnb Desktop Experience (Screenshots)— Captured Jun. 2020.
Airbnb, Inc.—Airbnb Mobile Application (Screenshots)—captured Jun. 2020.
Booking Holdings Inc.—Booking. com Desktop Experience (Screenshots)—Captured Jun. 2020.
Booking Holdings Inc.—Booking.com Mobile Application (Screenshots)—Captured Jun. 2020.
Expedia Group Inc.—Expedia Desktop Experience (Screenshots)— Captured Jul. 2020.
Expedia Group Inc.—Expedia Mobile Application (Screenshots)— Captured Jul. 2020.
Hotels.com LP—Hotels.com Desktop Experience (Screenshots)— Captured Jul. 2020.
Hotels.com LP—Hotels.com Mobile Application (Screenshots)— Captured Jul. 2020.
MakeMy Trip Limited—MakeMy Trip Desktop Experience Application (Screenshots) Captured Jul. 2020.
MakeMyTrip Limited—Trip Ideas Mobile Application (Screenshots)— Captured Jul. 2020.

* cited by examiner

500

SYSTEMS AND METHODS FOR IMPROVED GRAPHICAL USER INTERFACES BASED ON CONTEXTUAL INFORMATION

CROSS REFERENCE TO RELATED APPLICATION

This U.S. application claims the benefit of and priority to India Provisional Application No. 202241062685, filed Nov. 2, 2022, which is incorporated herein by reference in its entirety and for all purposes.

TECHNICAL FIELD

Embodiments of the present disclosure relate generally to systems and methods for improving a graphical user interface based on contextual information associated with an experience.

BACKGROUND

There are often several steps to take between searching for an experience, booking the experience, and partaking in the experience. For example, an experience may be a trip and the trip may need to be cancelled, a payment may need to be made, or an access code may need to be acquired (the access code may be used to unlock a door of a rented property). Information regarding the trip is often buried in an email or computer application, making it difficult to keep aspects of the trip organized and making it difficult to identify pertinent information in a timely manner. Additionally, the urgency of each step associated with an experience may change based on a point-in-time before or during the experience. For example, an experience may have a free cancellation as long as the cancellation is requested at least one month prior to the experience date, which then makes cancelling the experience a potential priority one month prior to the experience date. The access code may only be needed once an individual arrives at a designated location on the experience date thereby making access code acquisition a priority a day or two prior to the experience date. Enhanced systems and methods for identifying and completing such tasks at desirable times would be desirable.

SUMMARY

A first exemplary embodiment relates to a method of providing a digital object. The process includes receiving, by one or more processors experience information associated with an experience. The process includes evaluating, by the one or more processors, the experience information based on contextual information associated with the experience. The process includes determining, by the one or more processors, a priority of the experience information based on the evaluation. The process includes retrieving, by the one or more processors, a digital object template from a limited number of digital object templates based on the determined priority of the experience information. The process includes populating, by the one or more processors, the retrieved digital object template with corresponding experience information to generate a contextual digital interface object. The process includes providing, by the one or more processors, the contextual digital interface object on a graphical user interface of a user device. The contextual digital interface object comprises a selectable feature based on the corresponding experience information.

Another exemplary embodiment relates to a computing system for providing at least one contextual digital interface object. The system includes at least one memory device structured to store information regarding an experience. The system includes at least one processor coupled to the at least one memory device. The at least one processor is structured to receive experience information associated with an experience. The at least one processor is structured to evaluate the experience information based on contextual information associated with the experience. The at least one processor is structured to determine a priority of the experience information based on the evaluation. The at least one processor is structured to retrieve a digital object template from a limited number of digital object templates based on the determined priority of the experience information. The at least one processor is structured to populate the retrieved digital object template with corresponding experience information to generate a contextual digital interface object. The at least one processor is structured to provide the contextual digital interface object on a graphical user interface of a user device. The contextual digital interface object comprises a selectable feature based on the corresponding experience information.

Still another exemplary embodiment relates to a non-transitory computer-readable media having computer-executable instructions embodied therein that, when executed by at least one processor of a provider computing system, cause the provider computing system to perform operations. The operations include receiving experience information associated with an experience. The operations include evaluating the experience information based on contextual information associated with the experience. The operations include determining a priority of the experience information based on the evaluation. The operations include retrieving a digital object template from a limited number of digital object templates based on the determined priority of the experience information. The operations include populating the retrieved digital object template with corresponding experience information to generate a contextual digital interface object. The operations include providing the contextual digital interface object on a graphical user interface of a user device. The contextual digital interface object comprises a selectable feature based on the corresponding experience information.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
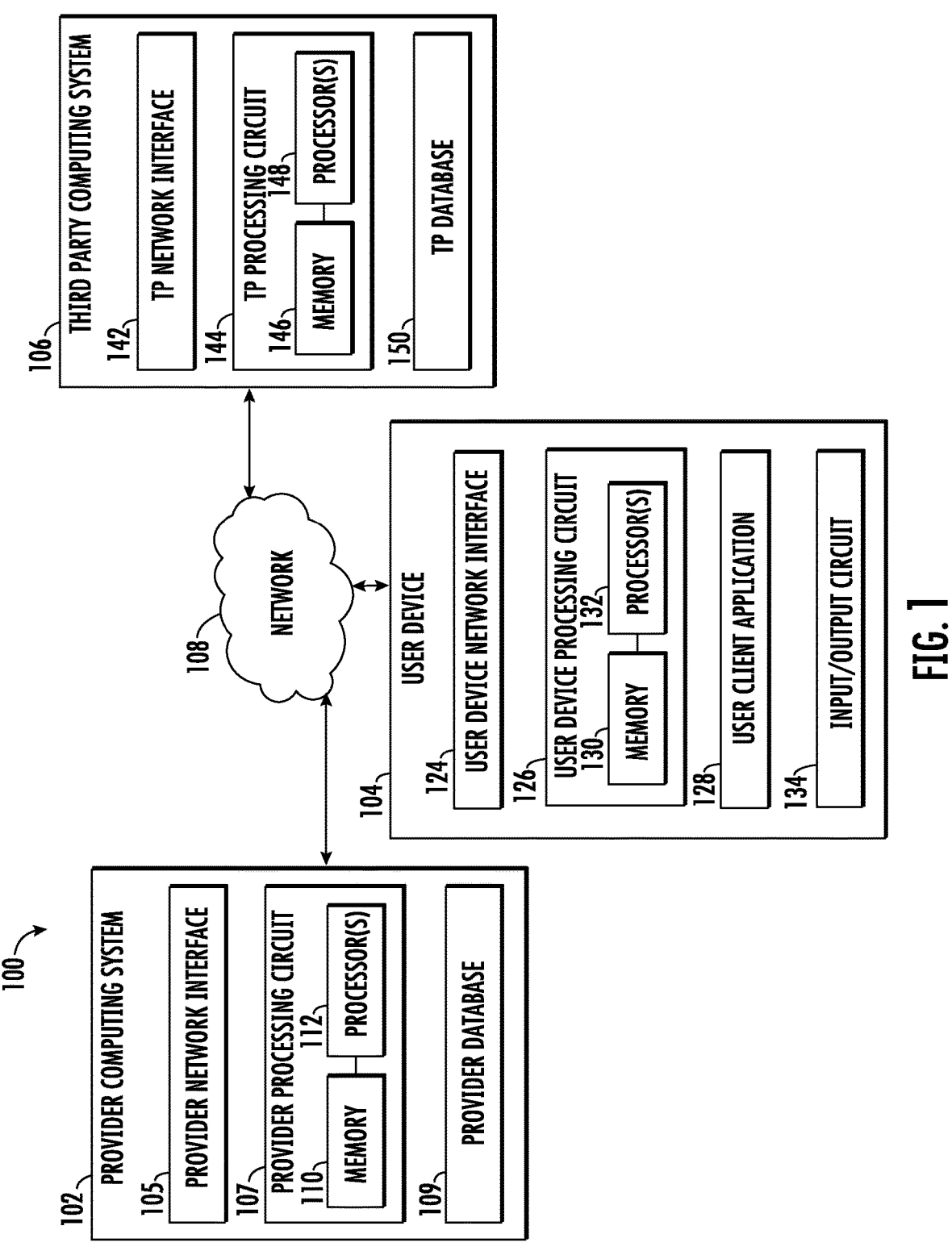
FIG. 1 is a block diagram of a contextual digital user interface system, according to some embodiments.

Referring generally to the Figures, aspects and embodiments of the present disclosure relate to a digital object production system that improves graphical user interfaces to reduce processing power needed to navigate computer applications to identify pertinent information by dynamically generating and providing updated graphical user interfaces based on contextual information. More specifically, the present disclosure relates to systems, apparatuses, and methods for receiving and/or determining experience information regarding an experience (e.g., a hotel reservation, a flight reservation, car rental information, attraction booking information, activity booking information, event booking information, etc.), evaluating the experience information based on the received contextual information (e.g., a location of the experience and/or a user associated with the experience, a relative time with respect to the experience such as a departure date, weather/emergency situations and/or other dynamic or changing information, etc.), determining a priority of the experience information based on the contextual information, retrieving a digital object template from a limited number of digital object templates based on the determined priority, populating the digital object template with corresponding experience information to generate a contextual digital interface object, and providing the contextual digital object to a user device. As described herein, the contextual digital interface object may include the digital object template and relevant experience information based on the determined priority of the experience information. As such, the contextual digital interface object is generated to be specific for a user and is based on the contextual information. As an example, the experience may be a hotel booking. The system can receive information regarding the hotel booking, such as a duration of the booking, a cost of the hotel booking, a free cancellation deadline such as one-month prior to the check-in date, local weather information during the visit/booking, and so on. Based on a determined a point in time relative to a date of the booking (i.e., the contextual information), such as one month prior to the hotel booking which coincides with the cancellation deadline, the systems and methods may generate and provide a contextual digital user interface object indicating the potential task or action item of canceling the hotel booking without charge. In some embodiments, multiple contextual digital user interface objects may be provided for display within a user client application of a user computing device (e.g., a smartphone, etc.). For example, a first digital object may be visible and show booking information that is most relevant and a second digital object may be accessible/ viewable via a swipe or other input from the user. The second digital object may depict booking information that is determined to be the second most relevant based on the received and/or determined contextual information.

According to the present disclosure and as described herein, a digital object production computing system is structured to provide information to a user regarding a booking status of an experience and/or action items related to the booking while reducing user interactions in a computer application associated with the booking while also reducing processing power, processing time, and memory storage. For example, a contextual digital user interface object (also referred to herein as a contextual digital interface object) may be provided to a user via a graphical user interface of a user device that may include information that is most relevant to the user based on contextual information (e.g., location, time, etc.) regarding the user and/or booking. In some embodiments, the contextual digital user interface object has a rectangular shape that is representative of a transaction card (e.g., a credit card, debit card, rewards card, etc.). As such and in one embodiment, the contextual digital user interface object may be referred to as a "contextual card" herein to signify the dynamic changing ability of information in the digital object (e.g., card) based on contextual information. In other embodiments, the contextual digital user interface object may have a different shape and/or size (e.g., circular, oval, diamond, trapezoidal, etc.). In one embodiment, the contextual digital object may be displayed prominently on a user interface of a user device such that a user does not need to navigate through pages of a website or screens of a mobile application to find the identified most pertinent information based on a context regarding the booking. This may eliminate unnecessary user interactions since the most pertinent information to the user is displayed upfront and may reduce processing power used to obtain such information.

Moreover and as described herein, there is a predetermined number of digital object templates that are populated with experience information based on the determined and/or received contextual information. Advantageously, by having a limited number of digital object templates, a reduction in the processing power, processing time, and memory space used to generate and provide user-applicable contextual digital user interface objects may be realized. For example, the digital object template can be updated or populated with text and/or images based on a determined context. Instead of generating a brand new digital object for each item of information to be provided to a user, the system and methods disclosed herein use the same predetermined set of digital object templates to generate and provide the contextual digital object. The limited number of digital object templates reduces the memory needed and only updating a portion of the template rather than generating a whole new digital object reduces the processing power and time needed to provide the appropriate information to the user. These and other features and benefits are described more fully herein below.

Referring now to FIG. 1, a system 100 for generating and providing dynamic user interface digital objects is shown (e.g., a contextual card production system), according to some embodiments. As shown in FIG. 1, the system 100 includes a provider computing system 102, a user device 104, and a third party computing system 106 communicably coupled to each other via a network 108. In some embodiments, any number of additional user devices 104 can be included. In the example shown, the network 108 is a wireless network. In this regard, the network 108 can be or include the Internet, an intranet, a cellular network, a Wi-Fi network, etc. In other embodiments, a wired network may be used. In still other embodiments, a combination of wired and/or wireless networks may be utilized. In the example depicted, the provider computing system 102 is physically remote from the user device 104 and the third party computing system 106.

The provider computing system 102 is shown as including a provider network interface 105, a provider processing circuit 107, and a provider database 109. The provider computing system 102 may be a computing system associated with a provider organization or entity, such as a travel agency, that provides and maintains one or more accounts on behalf of the user. For example, the provider may be a transportation provider (e.g., airline, car service, etc.), a lodging provider (e.g., hotel, rental property, cruise, etc.), an experience provider (e.g., theme parks, concerts, shows, events, excursions, etc.), or any combination thereof (e.g., a travel or experience booking agency) that provides or enables a variety of experiences. The provider network interface 105 facilitates connection of the provider computing system 102 to the network 108. The provider network interface 105 can support communication via the network 108 between the user device 104 and the provider computing system 102 and/or between the third party computing system 106 and the provider computing system 102. The provider network interface 105 may include communications ports (e.g., Ethernet ports), routing capabilities, a cellular modem, a wireless transceiver or beacon, etc. in various embodiments. In some embodiments, the provider network interface 105 includes cryptographic capabilities to establish a secure communications session.

The provider processing circuit 107 is structured to control, at least partly, the provider computing system 102 and to execute or otherwise enable the various operations attributed herein to the provider processing circuit 107. For example, the provider processing circuit 107 can execute the various processes shown in the figures and described in detail below, in various embodiments. The processing circuit includes at least one memory (one or more non-transitory computer readable media) 110 and one or more processors 112. The processor(s) 112 may be implemented as one or more general-purpose processors, application specific integrated circuits (ASICs), field programmable gate arrays (FPGAs), digital signal processors (DSPs), other suitable electronic processing components, or a combination thereof. The memory 110 may be implemented as RAM, ROM, NVRAM, Flash Memory, hard disk storage, solid state storage, etc. and may store data and/or computer-readable instructions (programming, logic, code) for providing the features described herein. The memory 110 stores computer-readable instructions that, when executed by the processor(s) 112, causes the processor(s) 112 to perform some or all of the operations attributed herein to the provider processing circuit 107 and/or provider computing system 102, in various embodiments.

The provider database 109 is structured to retrievably store (e.g., in non-transitory computer memory) data usable by the provider processing circuit 107 for providing and enabling certain operations as described herein. For example, the provider processing circuit 107 may be structured to read data from the provider database 109 and write data to the provider database 109. The provider database 109 can include various database components in various embodiments, for example memory in hard drive storage, disk storage, solid state storage, etc.

The user device 104 as shown in FIG. 1 can be a personal computing device, for example, a smartphone, tablet computer, desktop computer, laptop computer, virtual reality headset, augmented reality headset, etc. The user device 104 is associated with a user. The user may make one or more bookings for one or more experiences with the provider computing system 102 (e.g., hotel reservation, flight reservation, and/or other experiences). Thus, the user may be a customer of the provider institution associated with the provider computing system. As shown in FIG. 1, the user device 104 includes a user device network interface 124. The user device network interface 124 facilitates connection of the user device 104 to the network 108. The user device network interface 124 can support communication via the network 108 between the user device 104 and the provider computing system 102 and/or between the user device 104 and the third party computing system 106. The user device network interface 124 may include communications ports (e.g., Ethernet ports), routing capabilities, a cellular modem, a wireless transceiver or beacon (e.g., Bluetooth, near-field communication), etc. in various embodiments. In some embodiments, the user device network interface 124 includes cryptographic capabilities to establish a secure communications session.

The user device processing circuit 126 is structured to control, at least partly, the user device 104 and to execute or otherwise enable the various operations attributed herein to the user device 104. For example, the user device processing circuit 126 can execute the various processes shown in the figures and described in detail below, in various embodiments. The user device processing circuit 126 includes at least one memory (one or more non-transitory computer readable media) 130 and one or more processors 132. The processor(s) 132 may be implemented as one or more general-purpose processors, application specific integrated circuits (ASICs), field programmable gate arrays (FPGAs), digital signal processors (DSPs), other suitable electronic processing components, or a combination thereof. The memory 130 may be implemented as RAM, ROM, NVRAM, Flash Memory, hard disk storage, solid state storage, etc. and may store data and/or computer-readable instructions (programming, logic, code) for providing the features described herein. The memory 130 stores computer-readable instructions that, when executed by the processor(s) 132, causes the processor(s) 132 to perform some or all of the operations attributed herein to the user device processing circuit 126 and/or user device 104, in various embodiments.

FIG. 1 shows the user device 104 including a user client application 128. In the example shown, the user client application 128 is provided and supported, at least partly, by the provider computing system 102. Thus, the user client application 128 may also be referred to as a provider institution client application herein. In operation, the user client application 128 can be communicably coupled to the provider computing system 102 and may perform certain operations described herein, such as receiving experience information and populating a digital object template to be displayed as a contextual digital object on a user device. In some embodiments, the user client application 128 includes program logic stored in a system memory of the user device 104. In such arrangements, the program logic may configure a processor (e.g., processor(s) 132) of the user device 104 to perform at least some of the functions discussed herein with respect to the user client application 128 of the user device 104. For example, the user client application 128 may be downloaded from an app store, stored in the memory 130, and selectively executed by the processor(s) 132. In other embodiments, the user client application 128 may be hard-coded into the user device 104. In some embodiments, the user client application 128 is a web-based application. As alluded to above, the user client application 128 may be provided by the provider associated with the provider computing system 102 such that the user client application 128 supports at least some of the functionalities and operations described herein with respect to the provider computing system 102.

The user device 104 is further shown as including an input/output circuit 134. The input/output circuit 134 can include various components for providing outputs to a user of the user device 104 and receiving inputs from a user of the user device 104. For example, the input/output circuit 134 can include a display screen, a touchscreen, a mouse, a button, a keyboard, a microphone, a speaker, an accelerometer, actuators (e.g., vibration motors), including any combination thereof, in various embodiments. The input/output circuit 134 may also include circuitry/programming/etc. for operating such components. The input/output circuit 134 thereby enables communications to and from a user, for example communications relating to travel times and points of interest as described in further detail elsewhere herein.

The provider computing system 102 and/or the user device 104 may be configured to dynamically update one or more digital object templates based on contextual information regarding an experience, such as a status of a booking, a relative point-in-time, and/or a location of a user, among others, to generate a contextual digital interface object to be displayed on a user device.

As described herein, the contextual digital interface object (e.g., a contextual card) may be provided to a user to indicate a relevant task or event associated with an experience or a booking of the experience. A "booking" of an experience refers to a reservation of an experience, such as of an event, activity, transportation, lodging, a combination thereof, or the like. Multiple contextual digital interface objects may be organized to present the relevant tasks or events to a user in a prioritized order based on an urgency of each task or event based on determined or received contextual information (e.g., location of a user, relative time with respect to the experience, absolute time, user preferences, etc.). In one embodiment, the provider computing system 102 may be configured to receive and analyze data associated with at least one experience or booking to facilitate the completion of pending tasks and reduce the guess-work regarding the at least one experience. For example, the provider computing system 102 may be configured to determine that a payment is due for the booking in one week. The contextual information is the one-week timing. Based on this determination, the provider computing system 102 may update a digital object template to generate a contextual digital interface object that indicates the next payment deadline. The contextual digital interface object includes the digital object template and the associated information that is pertinent to the user based on the contextual information (a combination of information). The contextual digital interface object may also include one or more selectable features (e.g., links) to facilitate completion of the task without the user needing to manually navigate to a specific window, page, and/or to a different application. As the contextual information changes (e.g., as the date gets closer to the date of the trip, as the weather changes, etc.), the provider computing system 102 may identify different tasks that are more urgent than others and update the digital object templates (i.e., create updated contextual digital interface objects), and order/prioritize the contextual digital objects accordingly.

The third party computing system 106 is operated by, owned by, and/or otherwise associated with a third party relative to the provider institution. The third party may be any entity or organization, or any number of entities or organizations, that provides information related to an experience and/or booking. The information can include, for example, weather data, emergency services information (e.g., thunderstorms, tornadoes, accident information regarding traffic conditions, etc.), health safety information (e.g., infection outbreak, red tide, etc.), scheduling information (e.g., flight delays, rain delays for outdoor sporting event, etc.), content changes (e.g., a new person was added to speak on the panel, new opening artist for a concert, etc.), and/or any other information that may affect the booking/experience.

The third party computing system 106 is shown as including a third party network interface 142, a third party processing circuit 144, and a third party database. The third party network interface 142 facilitates and enables a connection of the third party computing system 106 to the network 108. The third party network interface 142 is structured or configured to support communication via the network 108 between the user device 104 and the third party computing system 106 and/or between the provider computing system 102 and the third party computing system 106. The third party processing circuit 144 is structured to control, at least partly, the third party computing system 106 and to execute or otherwise enable the various operations attributed herein to the third party processing circuit 144. For example, the third party processing circuit 144 can execute the various processes shown in the figures and described in detail below, in various embodiments. The third party processing circuit 144 includes memory (one or more non-transitory computer readable media) 146 and one or more processors 148. The memory 146 stores computer-readable instructions that, when executed by the processor(s) 148, causes the processor(s) 148 to perform some or all of the operations attributed herein to the third party processing circuit 144 and/or third party computing system 106, in various embodiments. The third party database 150 is structured to retrievably store (e.g., in non-transitory computer memory) data usable by the third party processing circuit 144 for providing operations as described herein.

Figure 2:
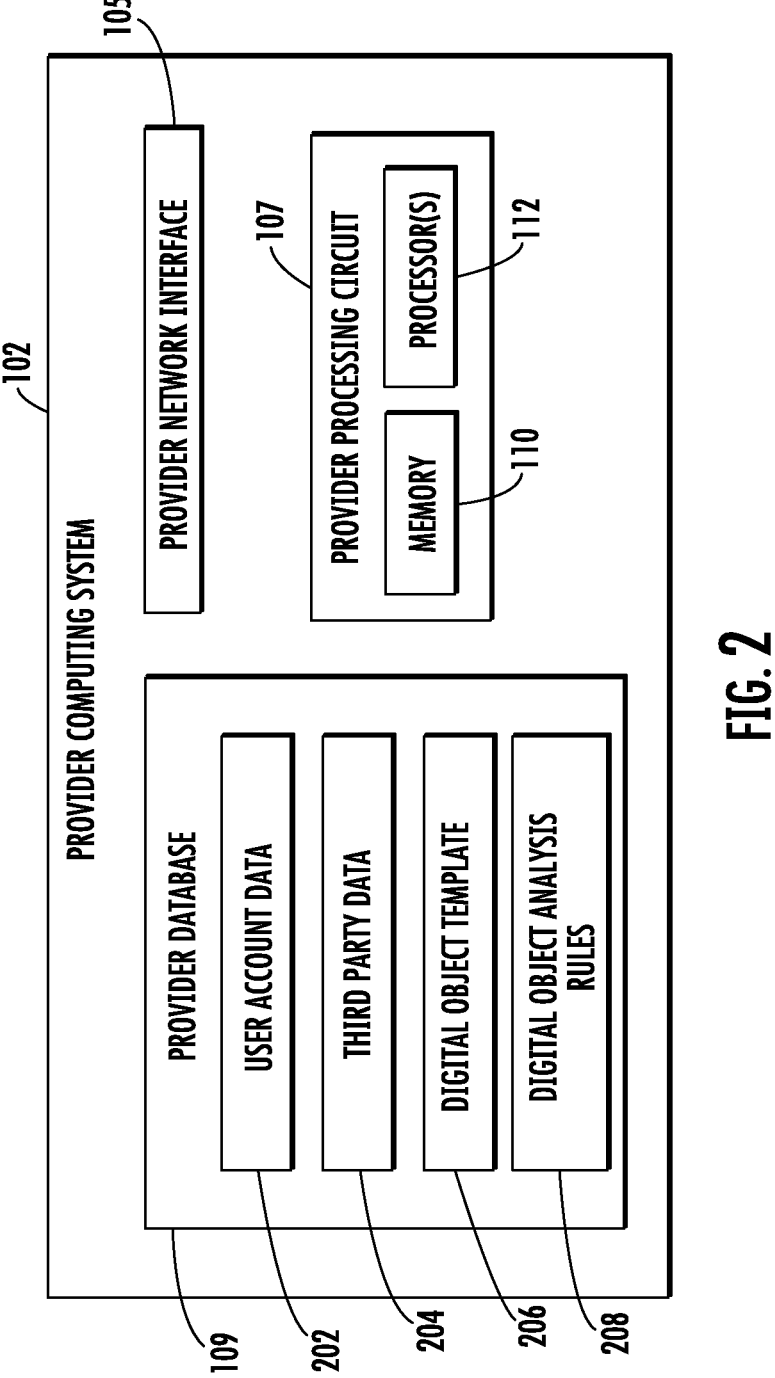
FIG. 2 is a block diagram of a provider computing system of FIG. 1, according to some embodiments.

Referring now to FIG. 2, the provider computing system 102 is shown in more detail, according to some embodiments. The provider computing system 102 is shown to include the provider database 109. The provider database 109 is structured to store user account data 202, third party data 204, one or more digital object templates 206, and one or more digital object analysis rules 208. A user may have a user account with a provider associated with the provider computing system 102. The user account data 202 may include user account information including, but not limited to, a user name, a user address, a user phone number(s), past and upcoming booking/experience information, authentication information (e.g., usernames, password, other credentials), user payment information, and/or user preferences that are associated with the user account. The user may also have an account with a third party. The third party data 204 may include third party user account information including, but not limited to, third party user payment information (e.g., credit card information, bank account information), third party authentication information, etc. The third party data 204 may also include data obtained or generated by the third party that relates to an experience booked, or to be booked, by the user. The user account data 202 and the third party data 204 may be used to update the digital object templates 206.

Figure 3:
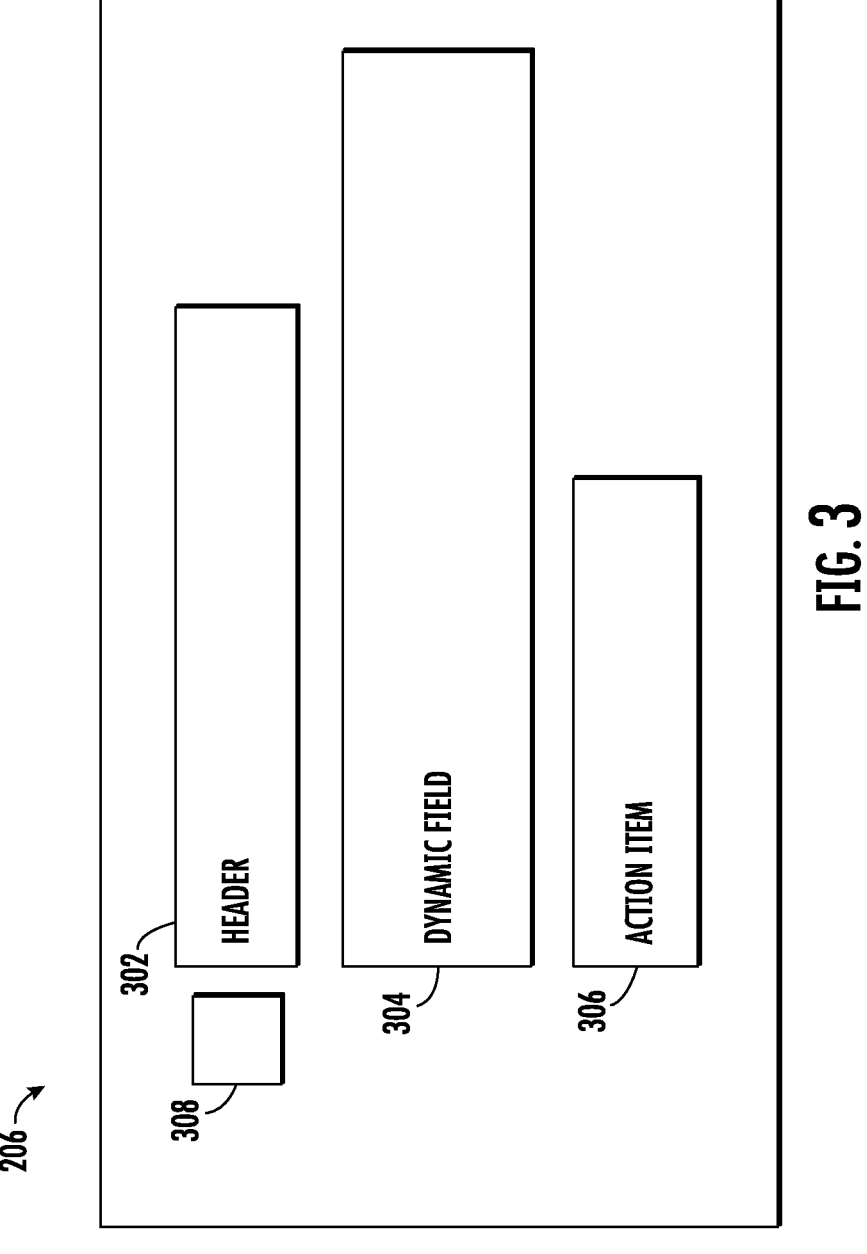
FIG. 3 is an illustration of a digital object template, according to some embodiments.
Figure 4:
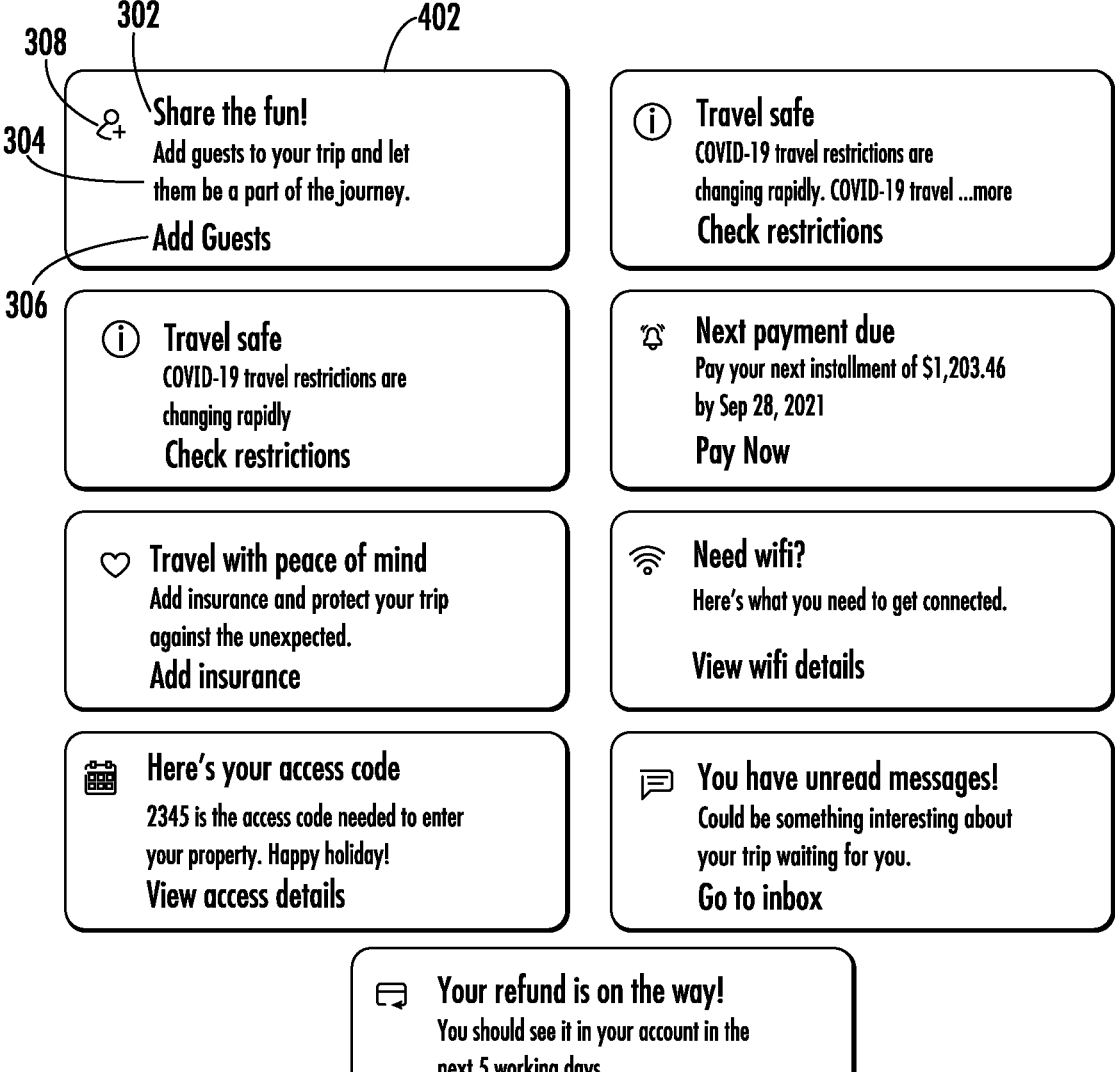
FIG. 4 is an illustration of a plurality of contextual digital interface objects, according to some embodiments.

Referring now to FIGS. 3 and 4, a digital object template 206 is shown according to an example embodiment. The digital object template 206 is a template that includes at least one dynamic field that can be populated with various information (e.g., information associated with an experience). The digital object template 206 can provide the various information and various functionalities to a user of a user device 104 that are related to an experience the user has booked. The digital object template 206 can dynamically update to provide the user with the most relevant information regarding an experience and facilitate completing of tasks associated with the experience. The digital object template 206 may include a plurality of fields that provide different information or functionalities. For example, as shown in FIG. 3, the digital object template 206 may include four fields (e.g., fields 302-308). A subset of the fields may be dynamic (e.g., variable, modifiable, updatable, changeable, etc.) while others are fixed (e.g. predetermined, unchangeable, non-variable, static, etc.). In some embodiments, the digital object template 206 may have more or less fields and different fields may be dynamic, while others are static. The fields may be arranged in one or more various arrangements on the digital object template 206.

As shown in FIG. 3, the digital object template 206 may include a first field, shown as header 302. The header 302 may indicate or describe a general category of the digital object template 206. The category refers to a topic of the digital object template 206, and may be associated with a booking. For example, the header 302 may relate to at least one of travel (e.g., travel conditions, public health, departure time, check-in/check-out time and procedures, etc.), a transaction (e.g., installment payment, refund, etc.), access (e.g., property access code, Wi-Fi password, etc.), or acknowledgement status (e.g., unread messages, status of cancellation, etc.). In this way and according to an exemplary embodiment, the number of categories and in turn the number of headers 302 may be limited in value to a predetermined number. For example, the provider database 109 may only store a predetermined number of digital object templates 206 with predetermined headers 302. In the depicted example, the number of headers/categories is limited to eight different headers 302, such that the number of digital object templates 206 is limited to eight different templates. The headers 302 in the example include "Share the fun!," "Travel safe," "Next payment due," "Travel with peace of mind," "Need Wi-Fi?," "Here's your access code," "You have unread messages!," and "Your refund is on the way!" As such, the header 302 may be a fixed or non-variable field of the digital object template 206. Having a limited number of digital object templates 206 reduces the storage space occupancy as well as a retrieval time (e.g., by the user device and/or by the provider computing system 102) of the digital object templates 206. For example, there are fewer digital object templates 206 to analyze and consider for each independent scenario, such that a desired digital object template 206 is easier to find or access due to the limited number of digital object templates 206. Furthermore, not dynamically updating or modifying the header 302 of the digital object template 206 can reduce computer processing requirements by reducing the number of fields and amount of information that is populated.

As shown in FIG. 4, the digital object templates 206 have predetermined headers 302. For example, a first digital object template 206 may have a first header 302 and a second digital object template 206 may have a second header 302. More digital object templates 206 may have additional headers 302 (e.g., third header, fourth header, fifth header, . . . X header). The predetermined headers 302 may include, for example, "share the fun," "travel safe," "travel with peace of mind," "next payment due," "need Wi-Fi," "here's your access code," "you have unread messages," and "your refund is on the way." As such, the number of digital object templates 206 stored in the provider database 109 may be based on the number of predetermined headers 302.

The digital object template 206 may include a second field, shown as a dynamic field 304. The dynamic field 304 may be configured to dynamically update to display information that is associated with an experience and/or a booking of the experience based on contextual information, such as a location of a user, a particular point in time relative to the experience, a status of the booking, etc. For example, the dynamic field 304 of a digital object template 206 may provide a first set of information at a first point in time (e.g., one month before the experience) and provide a second set of information at a second point in time (e.g., one day before the experience). The first set of information may include details that are more relevant to the user at the first point in time. For example, one month prior to a trip, a cancellation deadline may be more important to a user than local weather, such that the first set of information includes details regarding the cancellation deadline. The second set of information may include details that are more relevant to the user at the second point in time. For example, one day before the trip, a rental property access code may be more relevant than check-out procedures. Thus, the first set of information may differ from the second set of information. As such, the dynamic field 304 may be variable or changeable. The dynamic field 304 may be updated based on any type of experience information and/or contextual information associated with the experience. The dynamic field 304 may include, for example, trip information (e.g., date of check in, check out procedures, host information, time of the experience, experience requirements/restrictions (e.g., face masks required, whether outside food/beverages allowed, must print tickets, etc.), location, etc.), incomplete tasks (e.g., outstanding payments, check-in requirements, passport obtainment requirements, health screens (e.g., must provide proof of vaccination or negative test, etc.), etc.), acknowledgement statuses (e.g., cancellation request is still awaiting approval, guest invite acceptance deadlines for a vacation rental, message sent to host remains unanswered, unread messages in inbox, etc.), or emergency data (e.g., severe weather conditions at location of experience, infection outbreak at location of experience, etc.).

The digital object template 206 may include a third field, shown as an action item 306. The action item 306 may be or include a selectable feature that allows a user to provide a response or perform an action in response to the information provided via the dynamic field 304 of the digital object template 206. The selectable feature may be a link (e.g., a specific URL for an associated action) or icon associated with a link to enable the action. For example, the action item 306 may be for a payment, whereby selection of the action item 306 may facilitate payment of an outstanding installment by navigating to a GUI of a payment application where a user may provide and/or submit payment information to complete the payment. Selection of the action item 306 may navigate the user to a different window, webpage, application page, etc. without having to manually navigate to the desired location. For example, the action item 306 may be configured to facilitate payment of an outstanding install-ment by navigating the user to a payment application or enabling the user to enter payment information (e.g., credit card information, etc.). For example, selection of the action item 306 from within the user client application 128 may, for example, cause a prompt to be displayed on the user device 104 configured to receive payment information (e.g., credit card information) or cause a payment application on the user device 104 to open. The action item 306 may be based, at least in part, on the content of the dynamic field 304. For example, the action item 306 may include a link to a payment platform when the dynamic field 304 indicates a payment is required. As another example, the action item 306 may include a link to a third party website when the dynamic field 304 indicates public health concerns at a destination of a trip.

The digital object template 206 may include a fourth field, shown as an icon 308. The icon 308 may be an image (visual, audio-visual, and/or dynamic image such as a GIF) that relates to the information provided on the digital object template 206. For example, the icon 308 may be an image of an alarm bell when the digital object template 206 provides information regarding a payment deadline or a silhouette of a person when the digital object template 206 provides information regarding sharing trip details with other people, among others. The digital object template 206 may include any combination of sections and the sections can be arranged in any arrangement on the digital object template 206.

The limited number of digital object templates 206 along with the digital object templates 206 having only a subset of the fields 302-308 being dynamically configurable results in a reduction in the computation burden on the system that is providing the information to a user, reduces the time required to provide the information, and reduces the amount of storage spaced occupied by the system. For example, less space of the provider database 109 of the provider comput-ing system 102 is occupied due to the limited number of stored digital object templates 206. Additionally, the pro-vider computing system 102 can find or locate a desired digital object template 206 relatively quicker by searching through a limited number of digital object templates 206. Furthermore, the provider computing system 102 may then identify the desired digital object template 206 quicker and use relatively less computation power when identifying the desired digital object template 206 due to the limited number of digital object templates 206.

As shown in FIG. 4, the provider computing system 102 can provide various contextual digital interface objects 402 to a user device 104 to be displayed to a user of the user device 104 (e.g., from the client application). The provider computing system 102 may retrieve, generate, or store the contextual digital interface object 402. The contextual digi-tal interface object 402 may be an object (e.g., a card) displayed on a screen of the user device 104 that comprises information associated with an experience. The contextual digital interface object 402 may include the digital object template 206 and the corresponding information that is populated into the digital object template 206. The corre-sponding information is pertinent to a user based on or in response to the contextual information. For example, the contextual digital interface object 402 may include infor-mation regarding outstanding payments, property access codes, trip insurance, or weather or health conditions (e.g., infection outbreak, red tide, etc.) at the location of the booking, among others. The contextual digital interface object 402 can display the information from the digital object template 206 on a user device 104. The contextual digital interface object 402, or a portion thereof, may be dynamically updated based on how the digital object tem-plate 206 is updated.

Even though the number of digital object templates 206 may be limited, the number of contextual digital interface objects that can be generated is not limited to the same number. For example, as shown in FIG. 4, the same template (e.g., the template with the header 302 "Travel safe") may be used to generate more than one contextual digital interface object 402. For example, the dynamic field 304 of a digital object template 206 may include a first piece of experience information, and a contextual digital interface object 402 may be generated that includes the digital object template 206 with the first piece of experience information. The dynamic field 304 of the same digital object template 206 may be updated to include a second piece of experience information, and a contextual digital interface object 402 may be generated that includes the digital object template 206 with the second piece of experience information.

In the examples shown, the contextual digital interface objects 402 are rectangular shaped. Hence, in these example embodiments, the contextual digital interface objects 402 may be referred to as "contextual cards." In other embodi-ments, the shape, size, and/or positioning of the contextual digital interface objects 402 may differ. For example, the contextual digital interface object 402 may be circular shaped, oval shaped, diamond shaped, etc.; be provided as a separate user interface relative to other depicted information (e.g., as a splash page that interrupts a log-in process to the client application); and so on. In some embodiments, the shape of the contextual digital interface object 402 may be based on the device displaying the contextual digital inter-face object (e.g., a computer, a smart phone, etc.) or how the contextual digital interface object 402 is being displayed (e.g., via an application, via a web page, etc.). Also in the embodiments shown, the digital object template has four fields that are updated and/or modified based on contextual information. A subset of the fields can be modified, while the remaining fields can be predetermined. In some embodi-ments, the digital object template may have more or less fields and different fields may be modifiable, while others are predetermined.

Referring back to FIG. 2, the digital object analysis rules 208 may include rules (e.g., program logic of instructions) for the provider computing system 102 to execute when updating the digital object template 206. For example, the digital object analysis rules 208 may define when to provide a specific contextual digital interface object 402, what to display in the dynamic field 304 of the digital object template, and how to prioritize multiple contextual digital interface objects, among other rules.

The digital object analysis rules 208 may be based on one or more predetermined thresholds. The thresholds may include, for example, a time threshold, a location threshold, a combination thereof, and/or other thresholds. For example, the digital object analysis rules 208 may indicate that the provider computing system 102 may provide a contextual digital interface object 402 that depicts payment information based on a first threshold regarding a time relative to an experience start date (e.g., a predefined amount of days, such as 14 days, before the trip date) or provide a contextual digital interface object 402 that depicts weather information based on a second threshold regarding a time relative to the experience start date (e.g., a second predefined amount of days, such as 5 days, before the trip). In some embodiments, the thresholds may be specific to a category of the contextual digital interface object 402. For example, the category may be "access" (e.g., an access code to a rental property). The threshold for providing a contextual digital interface object 402 that falls within the "access" category may be set for a predetermined amount of time prior to the experience occurring (or, in some embodiments, a predefined distance within the associated property). For example, the contextual digital interface object 402 may include experience information regarding an access code for a rental property when the user device is determined to be within a predefined distance of the rental property. Based on including an access code, the contextual digital interface object 402 can be categorized in an "access" category. The threshold for contextual digital interface objects 402 in the "access" category may be a predefined time (e.g., twenty-four hours) prior to a start time of the experience. As such, the provider computing system 102 may not generate or provide the contextual digital interface object 402 with the access code to a user device 104 more than the predefined amount of time prior to the start time of the experience.

In some embodiments, the thresholds may be specific to the type of experience booked. For example, the type of experience may be a "free experience," a "travel experience" (e.g., includes a flight reservation or car rental), or an "event experience." When an experience is a "free experience," the threshold or rule may be that the provider computing system 102 cannot provide a contextual digital interface object 402 comprising transaction information. When an experience is a "travel experience," the threshold or rule may be that any contextual digital interface objects 402 comprising health safety information may be provided a predefined time (e.g., one week) prior to a start of the experience.

The digital object analysis rules 208 may include a default ranking of experience information associated with an experience. For example, the digital object analysis rules 208 may indicate a priority order of the experience information. For example, experience information related to emergency weather conditions may be ranked higher than experience information related to outstanding payments, which may be ranked higher than experience information related to guests that are also participating in the experience. The priority order may be based, at least partially, on a point in time. For example, at a first point in time, the experience information has a first priority order. For example, one month prior to the start date of an experience, a cancellation deadline is ranked higher than an outstanding payment trigger/prompt, which is ranked higher than local weather at a location of the experience. At a second point in time, the experience information may have a second priority order. For example, one week prior to the start date of the experience, the outstanding payment may be ranked higher than the local weather, and the cancellation deadline may not be ranked since the deadline may have passed.

The digital object analysis rules 208 may be specific to the user. For example, the digital object analysis rules 208 may be updated based on one or more previous user actions. For example, a digital object analysis rule 208 may be predefined to provide a contextual digital interface object 402 indicating a final payment installment that is due at a first period in time (e.g., two weeks before due date). However, for previous user experiences, the user paid final installments at a second period in time (e.g., two days before due date) different from the first period in time. Accordingly, the digital object analysis rules 208 may be modifiable by the user (e.g., via a preference) and/or by machine learning based on the previous user action(s) (e.g., the previous user action may modify the default ranking of experience information). For example, the digital object analysis rules 208 may be updated to provide the contextual digital interface object 402 at the second period in time rather than the first period in time.

The provider processing circuit 107 may retrieve and execute the digital object analysis rules 208 to modify a digital object template 206, generate a contextual digital interface object 402 that includes the digital object template 206 and the corresponding experience information, and provide the contextual digital interface object 402 to a user device 104. For example, the provider processing circuit 107 may be configured to analyze at least one of the user account data (e.g., booking data) or third party data (e.g., weather data), apply one or more digital object analysis rules 208 to the data, and modify a digital object template 206 based on the data and the digital object analysis rule 208. In some embodiments, the one or more processors 112 of the provider processing circuit 107 may be configured to determine a status of a booking of an experience. A booking of an experience refers to a reservation made by a user to attend or participate in the experience. The status of the booking may include a state of the booking and a phase of the experience. The state of the booking may include, for example, at least one of pending, booked, pending cancellation, or cancelled status. The one or more processors 112 may be configured to determine the state of the booking based, at least partially, on information provided by the user via the user client application 128. For example, the state of the booking may be based on a user input received by the user device 104 via the user client application 128 and transmitted to the provider computing system 102. For example, the user client application 128 may facilitate booking of an experience for a user by providing options of experiences to select. The state of the booking may be determined to be booked after the user selects one of the experiences and submits all necessary information for the booking. The necessary information may include, for example, identification information and payment information. The state of the booking may be considered pending cancellation after a user submits a cancellation request via the user client application 128, but the provider computing system 102 has not yet confirmed or denied the cancellation request.

The "phase of the experience" refers to a point in time relative to the experience. For example, the phase of the experience may be several months before the experience begins or occurs, a couple days before the experience begins or occurs, the day the experience begins or occurs, or a number of days into the experience relative to a duration of the experience (e.g., four days left in a trip). The one or more processors 112 may be configured to determine the phase of the experience. For example, the provider database 109 may be configured to store experience details as user account data 202. For example, the experience details may include at least one of a start date, an end date, or a duration of the experience. The one or more processors 112 may be configured to calculate a number of days away a point in time is from, for example, the start date of the experience. The point in time may be a present point in time such that the point in time is based on when the one or more processors 112 determines the phase of the experience.

While various examples provided herein may refer to the functionality and structure of the provider computing system 102, in some embodiments, the digital object templates 206 and the digital object analysis rules 208 may instead be a part of or executed by the user client application 128 of the user device 104. As such, execution of the digital object analysis rules 208 to select and modify the digital object templates 206 and generate the contextual digital interface objects 402 may be done locally on the user device 104 and not executed by the provider computing system 102. In some embodiments, the functions and capabilities are shared between the user device 104 and the provider computing system 102.

The provider computing system 102 may be configured to receive and store data associated with an experience (e.g., user account data 202, third party data 204, etc.). The one or more processors 112 may be structured to analyze the data and categorize the data based on a predefined number of categories. For example, the one or more processors 112 may be structured to categorize the data as data that relates to an experience (e.g., date of experience, time of experience, duration of experience, location of experience, type of experience), an incomplete task (e.g., outstanding payment installment, unconfirmed cancellation, missing seat selection, not shared with other experience participants, etc.), an acknowledgement status (e.g., unread messages, awaiting response from host, etc.), or an emergency situation (e.g., severe weather, infection outbreak, etc.). Based on the user account data 202, for example, the one or more processors 112 may be configured to identify traveler information needed that is relevant to the status of the booking. For example, the one or more processors 112 may be configured to identify a cancellation policy of the booking, access codes for a property of the booking, directions to a destination of the booking, Wi-Fi codes for the booked property, among others. Based on the user account data, the one or more processors 112 may be configured to identify actions that are due to be taken and actions that have already been completed. For example, the one or more processors 112 may be configured to identify a first payment has been paid, but a second payment is still outstanding, or that guests have not yet been added to the booking. Based on the user account data, the one or more processors 112 may be configured to identify responses or acknowledgements that are due from the provider or other hosts in response to actions that have been taken by the user. For example, the one or more processors 112 may be configured to determine that a user requested to modify a booking (e.g., cancel, change dates, etc.) and the provider has yet to respond to the request (e.g., approve or deny the request) or that the user sent a message to the provider or other hose that has remains unread. Based on the third party data 204, the one or more processors 112 may be configured to identify an emergency situation (e.g., disaster warnings, public health warnings, etc.). For example, the one or more processors 112 may be configured to identify a disaster warning, a weather warning, or a public health concern based on data received from a third party.

The one or more processors 112 may be configured to identify a subset of the experience information that is relevant to the user based on determined or received contextual information (e.g., relative time, absolute time, location, user preferences, previous user actions, etc.). For example, the subset of the experience information may be based on the phase of the experience. The phase of the experience may be a number of days prior to the experience (which may be determined by the processors 112 based on a current date relative to a start date for the experience). The subset of experience information that is relevant based on the contextual information may include the information associated with tasks that can be completed at this phase of the experience or information that may be important to the user at that phase. For example, several months prior to an experience, a cancellation policy, a payment deadline, and missing experience participants may be relevant or completed. A week prior to the trip, an unanswered message to the provider and a forecasted hurricane may be relevant or completed. The day the trip begins, directions, an access code, and Wi-Fi codes may be relevant. The last day of the trip, checkout time, departure time, and cleaning requirements may be relevant or completed. The subset of experience information may include any amount of the information.

The one or more processors 112 may be configured to evaluate the experience information, or the subset thereof to determine a priority of the experience information. For example, the one or more processors 112 may weigh each piece of information against each other to determine a priority of the experience information. For example, each piece of information may have a weight based on its associated category (e.g., experience information, incomplete task, acknowledgement status, emergency situation, etc.). For example, an emergency situation may have a greater weight than an acknowledgement status. Pieces of information within the same category may have weights based on an urgency of the information. For example, a cancellation deadline approaching in one week may be more urgent than a final payment deadline approaching in a month. The one or more processors 112 may further be configured to apply the digital object analysis rules 208. For example, the digital object analysis rules 208 may indicate that a severe storm warning has a greater weight than a Wi-Fi password. The one or more processors 112 may also be able to adjust the digital object analysis rules 208 based on various factors. For example, the one or more processors 112 may take into account a severity of the information (e.g., outbreak of a pandemic versus a mild virus going around) an urgency of the information (e.g., payment is due in one month versus last day to cancel is in two days), or a quantity of the information (e.g., there are several outstanding/unanswered messages sent to or receive from the provider), among other factors. The ranking may include a rank for each piece of experience information, or the subset thereof. For example, a first piece of experience information may have a first or top rank (e.g., most important/urgent), a second piece of experience information may have a last or bottom rank (e.g., least important/urgent), and any remaining pieces of experience information may be ranked between the first and second piece of experience information.

The one or more processors 112 may be structured to generate one or more notifications to be provided to a user. A notification may be based on the subset of the experience information (e.g., based on the experience information and the contextual information). For example, piece of information may indicate an action for the user to complete in a short period of time (e.g., pay an installment in the next week). The one or more processors 112 may be configured to determine that the notification may include the amount of the installment and the due date. A piece of information may indicate that the provider accepted a cancellation request and has issued a refund. The one or more processors 112 may be configured to determine that the notification may include an indication that a refund has been approved and when the user can expect to receive the refund. The one or more processors 112 may be configured to generate a notification for each piece of information, or the subset thereof.

The one or more processors 112 may be structured to modify one or more digital object templates 206. To modify a digital object templates 206, the one or more processors may be configured to retrieve a digital object template 206 from the provider database 109. The digital object template 206 may be based on the notification generated by the one or more processors 112. For example, when the notification includes a property access code, the one or more processors 112 may retrieve an access digital object template 206 that indicates an access code in the header 302 (e.g., "here's your access code"). When the notification includes a disaster warning, the one or more processors 112 may retrieve a travel digital object template 206 that indicates travel safety in the header 302 (e.g., "travel safe"). The retrieved digital object template 206 may have a predetermined header 302. The header 302 may be invariable or unchangeable.

The one or more processors 112 may be structured to update one or more digital object templates 206 to include a notification. For example, the one or more processors 112 may be configured to update the dynamic field 304 to display the notification. The one or more processors 112 may be configured to update a location to which the action item 306 enables navigation to based on the notification. For example, the action item 306 may be configured to navigate to a third-party weather website when the notification indicates a weather warning or the action item 306 may navigate to a payment platform when the notification indicates an installment is due. The one or more processors 112 may be configured to update a plurality of digital object templates 206, each to include a different notification. In some embodiments, the one or more processors 112 may be configured to update a digital object template 206 a plurality of times to generate a plurality of contextual digital interface objects 402. For example, the one or more processors 112 may update the digital object template 206 to include a first notification and generate a first contextual digital interface object 402 that includes the digital object template 206 with the first notification. The one or more processors 112 may update the same digital object template 206 to include a second notification and generate a second contextual digital interface object 402 that includes the digital object template 206 with the second notification. The same digital object template 206 can be used to generate any number of contextual digital interface objects 402.

In some embodiments, the user device 104 can perform some or all of the functions as described herein. For example, the user device 104, via the user client application 128, may be configured to receive and analyze experience information and contextual information (e.g., determine a priority of the experience information), obtain a digital object template 206 (e.g., retrieve from memory 130 or receive from provider computing system 102), update the digital object template 206 based on the experience information and the contextual information, generate the digital object template 206 to include the updated digital object template 206 and the corresponding experience information that is pertinent to a user based on the contextual information, and display the contextual digital interface object 402 according to a determine priority. The user client application 128 may include an API that facilitates production and delivery of the contextual digital interface object 402 for display via the user device 104.

Figure 5:
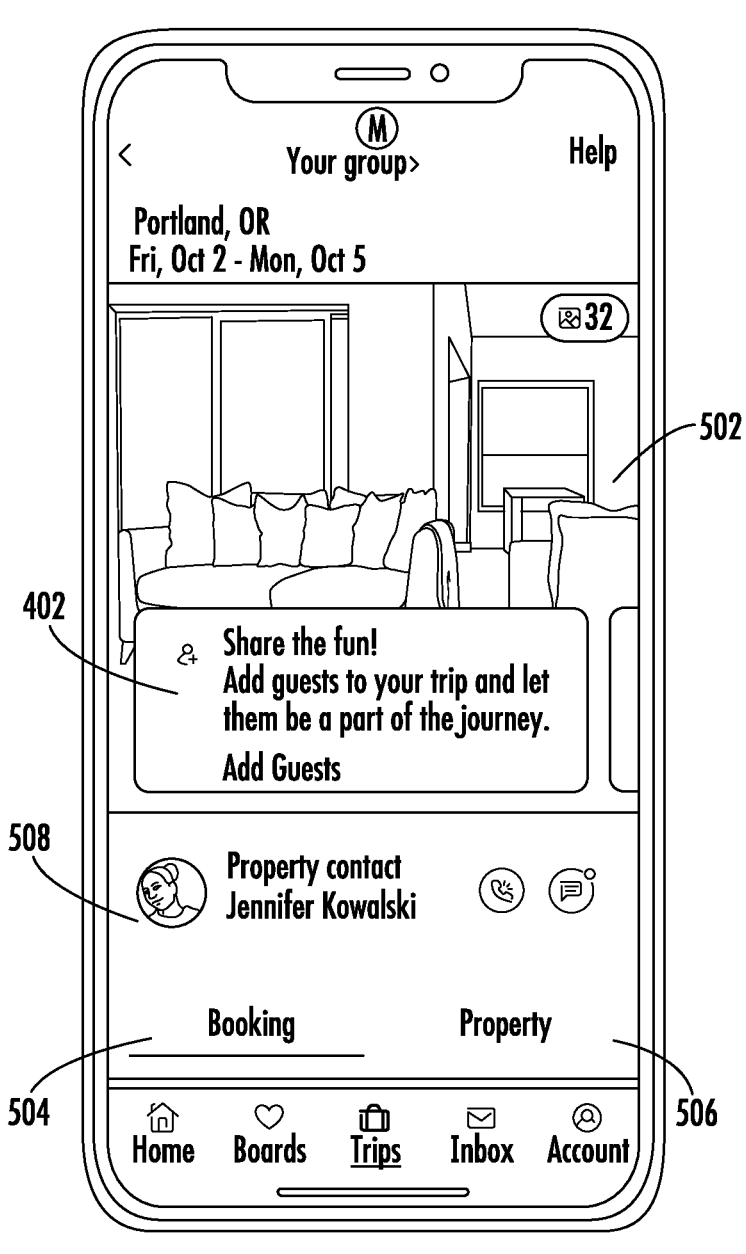
FIG. 5 is an illustration of a user interface with a contextual digital interface object, according to some embodiments.

Referring now to FIG. 5, a contextual digital interface object 402 that may be displayed on a user interface 500 of the user device 104 is shown, according to an example embodiment. The contextual digital interface object 402 may be displayed via a website or the user client application 128 on the user device 104. The user interface 500 may, for example, be a splash page that immediately appears upon opening of a user client application 128 or upon navigating to a provider webpage. The contextual digital interface object 402 may cover a portion of the user interface 500.

With a plurality of contextual digital interface objects 402 transmitted to the user device 104 for display, the user device 104 may display the contextual digital interface objects 402 such that a contextual digital interface object 402 based on a top ranked data point (a first contextual digital interface object 402) is shown more prominently than other contextual digital interface objects 402. For example, a first contextual digital interface object 402 may be displayed fully on the screen and remaining contextual digital interface objects 402 may be displayed at least partially out of the screen. For example, as shown in FIG. 5, a first contextual digital interface object 402 is fully visible (e.g., each field 302-308 is visible) on the user interface 500. A portion of a second contextual digital interface object 402 is visible to the right of the first contextual digital interface object 402. A user interaction (e.g., a swipe) with the user interface 500 can cause the contextual digital interface objects 402 to move (e.g., slide across the user interface 500) such that each contextual digital interface object 402 can be selectively displayed. For example, the user device 104 may receive an indication of a user interaction (e.g. a swipe to the left) and in response, slide the first contextual digital interface object 402 to the left and replace the first contextual digital interface object 402 with the second contextual digital interface object 402. A portion of a third contextual digital interface object 402 may now be displayed to the right of the second contextual digital interface object 402. A portion of the first contextual digital interface object 402 may be displayed to the left of the second contextual digital interface object 402. The contextual digital interface objects 402 can move in any direction to scroll through the plurality of contextual digital interface objects 402. As such, a user may scroll or swipe through the contextual digital interface objects 402 to see the remaining contextual digital interface objects 402. The order of the contextual digital interface objects 402 displayed on the user interface 500 may correspond with the ranking or priority of the corresponding experience information associated with each contextual digital interface object 402.

In some embodiments, the user interface 500 may include overlaying information in order to display various information at one time. For example, the user interface 500 may include an image 502 related to an experience and a contextual digital interface object 402 displayed over a portion of the image 502. The image 502 may be a still image or a video.

In some embodiments, the user interface 500 may include any number of selectable features. For example, the user interface 500 may include a first selectable feature, shown as booking tab 504 and a second selectable feature, shown as property tab 506. Selection of either tab 504, 506 can cause the information on the user interface 500 to change. For example, selection of the booking tab 504 may cause the user interface to display information regarding a booking of an experience. Selection of the property tab 506 may cause the user interface 500 to display information regarding a property associated with the experience.

In some embodiments, the user interface 500 may include an information field 508. The information field 508 may include information and/or other selectable features related to the experience. For example, the information field 508 may include contact information for a host or organizer of the experience and provide selectable features to facilitate contacting the host (e.g., selection of a selectable feature may automatically call the host or open a chat window via the user interface 500).

Figure 6:
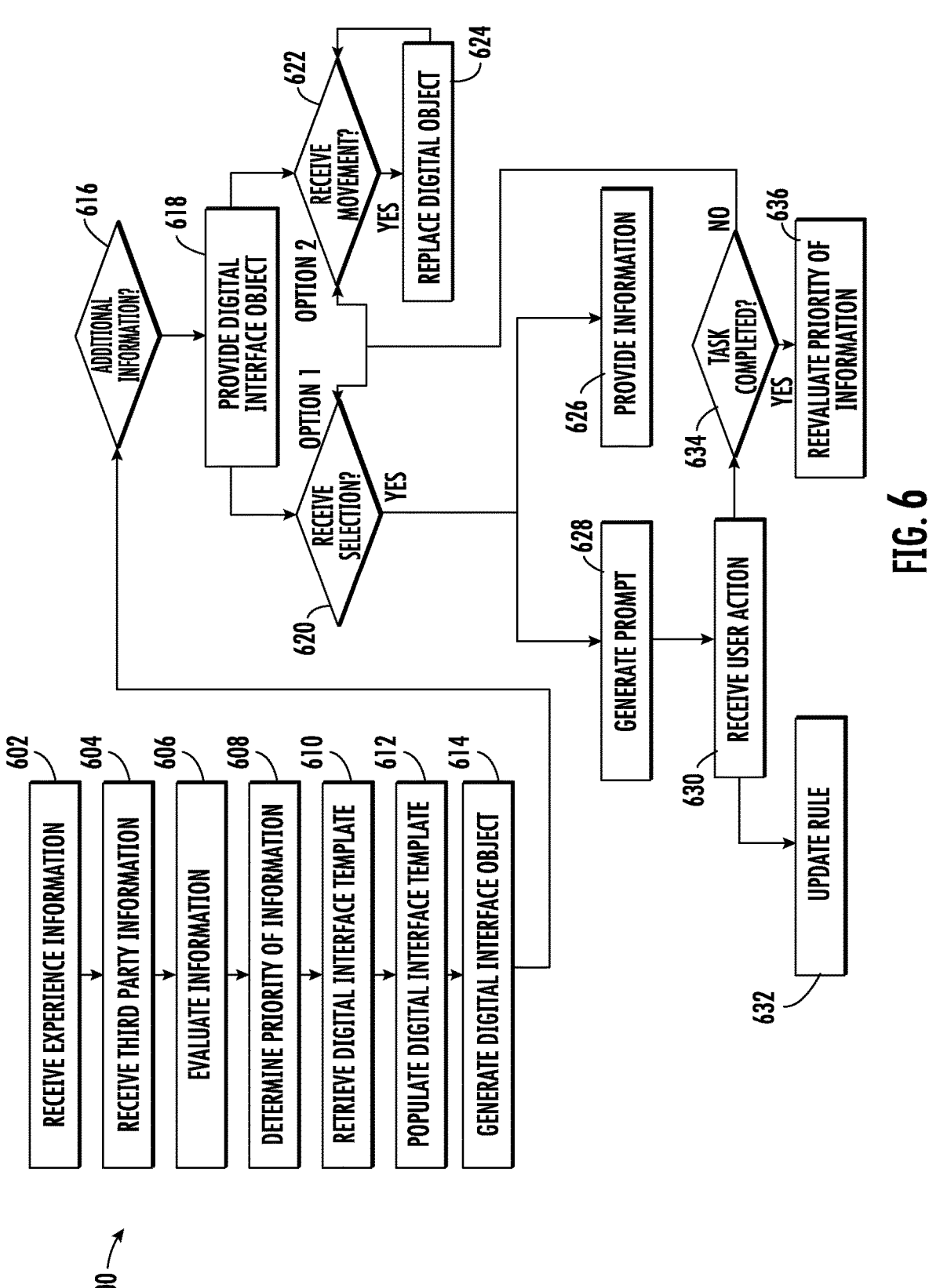
FIG. 6 is a flowchart of a process for providing a contextual digital interface object, according to some embodiments.

Referring now to FIG. 6, a process 600 of providing a contextual digital interface object is shown, according to an exemplary embodiment. Process 600 may include receiving experience information (step 602), receiving third party information (step 604), evaluating the information (step 606), determining a priority of the information (step 608), retrieving a digital object template (step 610), populating the digital object template (step 612), generating a contextual digital interface object (step 614), and determining whether there is more information to apply to a digital object template (step 616). If there is additional information, process 600 may return to either step 610 or 612. If there is no additional information, process 600 may include providing the contextual digital interface object (step 618), determining whether a selection was received (step 620), and/or determining whether a movement was received (step 622). If a movement was received, process 600 may include replacing the contextual digital interface object (step 624). If a selection was received, process 600 may include at least one or providing information (step 626) or generating a prompt (step 628). If process 600 includes generating a prompt, process 600 may include receiving a user action (step 630), updating a rule (step 632), and determining whether a task is completed (step 634). If a task is not completed, process 600 may return to either step 620 or step 622. If a task is completed, process 600 may include reevaluating a priority of the information (step 636).

At step 602, one or more processing circuits may receive experience information. For example, a provider computing system 102 may receive experience information. Experience information can be any information associated with an experience and/or a person(s) (e.g., a user) to participate in the experience. For example, experience information may include cost of the experience, date(s) of the experience, duration of the experience, location of the experience, type of experience (e.g., hotel booking, excursion, concert, etc.), a task to be completed (e.g., payment installment), an outstanding communication (e.g. awaiting reply from host), local weather, among other information. Experience data may also include user account information (e.g., user account data 202) including, but not limited to, names, addresses, phone numbers, bookings, authentication information (e.g., usernames, password), previous user actions (e.g., previous bookings, previous payments, etc.), or user preferences, among others.

At step 604, one or more processing circuits may receive third party information. For example, the provider computing system 102 may receive the third party information. The third party information (e.g., third party data 204) may include third party user account information including, but not limited to, payment information (e.g., credit card information, bank account information) or third party authentication information, among others. The third party information may also include data obtained or generated by the third party that relates to the experience booked, or to be booked, by the user. For example, the third party information may include weather data, emergency services information (e.g., thunderstorms, tornadoes), health safety information (e.g., infection outbreak information, etc.), scheduling information (e.g., flight delay, rain delay for outdoor sporting event, etc.), content changes (e.g., a new person was added to speak on the panel, new opening artist for a concert, etc.), or any other information that can have an effect on the experience.

At step 606, one or more processing circuits may evaluate the information received regarding the experience. For example, the provider computing system 102 may evaluate the information. The evaluation of the received information may be based on contextual information. When the provider computing system 102 receives third party information, the contextual information may be based at least partially on the third party information. For example, the received information may be evaluated based on a state of the booking of the experience (e.g., pending, booked, pending cancellation, cancelled), a phase of the experience (e.g., how long before the experience begins, a point during the experience, etc.), or a location of the user, among other contextual information. For example, the phase of the experience may be several months before the experience, a couple days before the experience, the day the experience begins, or a day during the duration of the experience. Evaluating the information may include categorizing the information. The categories may include, for example, experience data (e.g., date of experience, time of experience, duration of experience, location of experience, type of experience), an incomplete task (e.g., outstanding payment installment, unconfirmed cancellation, missing seat selection, not shared with other experience participants, etc.), an acknowledgement status (e.g., unread messages, awaiting response from host, etc.), or an emergency situation (e.g., severe weather, infection outbreak, etc.). Evaluating the information may include identifying a subset of the information that is relevant to the user based on the contextual information. The provider computing system 102 may receive contextual information from the user device, from the third party computing system, and/or determine the contextual information. In other embodiments, the user device may receive and/or determine the contextual information. As described herein, the contextual information may include, but is not limited to, a current location of the user (e.g., as described by the client application accessing a location positioning system on the user device), a current time (e.g., relative to the booked experience or non-booked experience), information regarding dynamic changes (e.g., weather information from the third party computing system that is local to the experience, traffic conditions from the third party computing system that is at or near the experience), a combination thereof, and so on. Thus, in certain embodiments, the client application may prompt the user to enable location services with the client application. As described herein, the location information may be used to timely generate and provide a contextual digital object comprising an access code for a rental property (e.g., when the user is detected or determined to be within a predefined distance of the rental property).

At step 608, one or more processing circuits may determine a priority of the experience information. For example, the provider computing system 102 may determine a priority of the experience information. The experience information may include the information associated with the experience and the third party information. The priority of the information may be based on the evaluation from step 606. For example, the priority of the information may be indicative of what information is most relevant to user based on the contextual information. For example, the priority of the information may change based on a point in time relative to the experience or a user's location relative to the location of the experience. For example, the provider computing system 102 may determine a priority of the information based on a first time relative to an experience, and may adjust the priority of the information based on a second time relative to the experience. The priority of the information may rank each piece of information from most relevant to least relevant. The priority may be based on several factors including, but not limited to, quantity (e.g., one outstanding message to the host versus five outstanding messages), severity (e.g., light rain versus hurricane) and urgency (e.g., one month prior to deadline versus one day prior to deadline). The provider computing system 102 can apply rules (e.g., digital object analysis rules 208) to the pieces of information and determine the priority of the information, or the subset thereof, based on the contextual information.

At step 610, one or more processing circuits may retrieve a digital object template 206. For example, the provider computing system 102 may retrieve the digital object template 206. The provider computing system 102 may retrieve the digital object template 206 from the memory 110 of the provider computing system 102. Retrieving the digital object template 206 may include identifying a digital object template 206 from a limited number of digital object templates 206 based on the priority of the information. For example, the provider computing system 102 may identify a plurality of digital object templates 206 to correspond with a plurality of pieces of information. The provider computing system 102 may identify a first digital object template 206 that corresponds with a first piece of information that has first priority and may identify a second digital object template 206 that corresponds with a second piece of information that has second priority. The provider computing system 102 may retrieve a digital object template 206 that corresponds with each piece of information that was prioritized.

At step 612, one or more processing circuits may populate the digital object template 206. For example, the provider computing system 102 may populate the digital object template 206. The provider computing system 102 may populate the digital object template 206 with corresponding experience information. For example, the provider computing system 102 may populate only the dynamic field 304 of the digital object template 206 with the corresponding experience information. The corresponding experience information may be in the form of a notification to be provided to a user of a user device 104. The provider computing system 102 may populate a plurality of digital object templates 206 and/or may populate a digital object template 206 several times with different corresponding information. The provider computing system 102 may populate the digital object template 206 to generate a contextual digital interface object 402.

At step 614, one or more processing circuits may generate a contextual digital interface object 402. For example, the provider computing system 102 may generate the contextual digital interface object 402. The contextual digital interface object 402 may include the digital object template 206 and the corresponding experience information. The corresponding experience information can be pertinent to a user based on the contextual information. The contextual digital interface object 402 can display the pertinent experience information to the user.

At step 616, one or more processing circuits may determine whether there is additional information to apply to a contextual digital interface object 402. For example, the provider computing system 102 may determine whether there is additional information to apply to a contextual digital interface object 402. If there is, process 600 can return to either step 610 or 612. For example, if a second piece of information is to be applied to a contextual digital interface object 402, the provider computing system 102 may return to step 610 and retrieve a second digital object template 206 that corresponds with the second piece of information. If second piece of information corresponds with the first digital object template 206, the provider computing system 102 may return to step 612 and repopulate the first digital object template 206 with the second piece of information. As such, a single digital object template 206 may be used to generate a plurality of contextual digital interface objects 402.

At step 618, one or more processing circuits may provide the contextual digital interface object 402 to user device 104. For example, the provider computing system 102 may provide the contextual digital interface object 402 to the user device 104 (e.g., within client application of the user device 104, such as on a home screen of the application). The contextual digital interface object 402 may be displayed on a graphical user interface of the user device 104 to a user. The contextual digital interface object 402 may include a selectable feature (e.g., action item 306) based on the corresponding experience information. The selectable feature may be associated with a task associated with the experience.

At step 620, one or more processing circuits may determine whether an indication of a selection was received. For example, the provider computing system 102 may determine whether an indication of a selection was received. For example, a user may provide a selection of the selectable feature of the contextual digital interface object 402 via the user client application 128. The provider computing system 102 may receive an indication of the selection from the user client application 128. If an indication of a selection was not received, at step 622, one or more processing circuits may determine whether an indication of a movement of a contextual digital interface object 402 was received. For example, the provider computing system 102 may determine whether an indication of a movement of a contextual digital interface object 402 was received. For example, a user may provide a movement of a contextual digital interface object 402 via the user client application 128. The provider computing system 102 may receive an indication of the movement from the user client application 128. Responsive to receiving an indication of a movement, at step 624, one or more processing circuits may replace the contextual digital interface object 402 with a second contextual digital interface object 402. For example, the provider computing system may replace the contextual digital interface object 402 with a second contextual digital interface object 402. The second contextual digital interface object may be based on the priority of the experience information.

Referring back to step 620, responsive to receiving an indication of a selection of a selectable feature, at step 626, one or more processing circuits may provide information associated with the corresponding experience data of the contextual digital interface object 402. For example, the provider computing system 102 may provide the information. Providing information may include navigating to a new webpage or generating a new window to display the information. Responsive to receiving an indication of a selection of a selectable feature, at step 628, one or more processors may generate a prompt. For example, the provider computing system 102 may generate a prompt. The prompt may be to receive at least one authentication credential specific to a task associated with the corresponding experience information of the contextual digital interface object 402.

At step 630, one or more processing circuits may receive a user action. For example, the provider computing system 102 may receive a user action. For example, the provider computing system 102 may receive the authentication credential via a graphical user interface of the user device 104. Responsive to receiving the user action, at step 632, one or more processing circuits may update a digital object analysis rule 208. For example, the provider computing system 102 may update the digital object analysis rule 208. The provider computing system 102 may store the updated digital object analysis rule in the provider database 109. Responsive to receiving the user action, one or more processing circuits may enable completion of a task and determine whether the task is completed. For example, the provider computing system 102 may enable completion of the task and determine whether the task is completed.

Responsive to completion of the task, at step 636, one or more processing circuits may reevaluate the priority of the experience information. For example, the provider computing system 102 may reevaluate the priority of the experience information to determine a new priority of the experience information. For example, if a task associated with a first ranked piece of information, the first ranked piece of information may no longer be relevant to the user such that the first ranked piece of information is removed from the ranking and the second ranked piece of information is now the first ranked piece of information. The provider computing system 102 may determine a new priority of the experience information.

While the examples disclosed herein may refer to specific components of the system 100 as performing specific functions or steps, the functions and steps may in fact be performed by one or more of the components of the system 100. For example, process 600 may be performed solely via the provider computing system 102, solely via the user device 104, or a combination of the two. The third party computing system 106 may identify the third party information responsive to a request from the provider computing system 102. For example, the provider computing system 102 may generate and transmit a third party information request to a third party computing system 106 based on received experience data. The request may be for third party information associated with the experience. For example, the request may be for contextual information (e.g., weather data) associated with a location of the experience. In some embodiments, the third party computing system 106 may identify and transmit the third party information based on predetermined time intervals (e.g., a predetermined number of times per day) or based on availability of the information. For example, the third party computing system 106 may identify and transmit third party information as soon as the information is available (e.g., when a severe weather warning is first issued).

Figure 7:
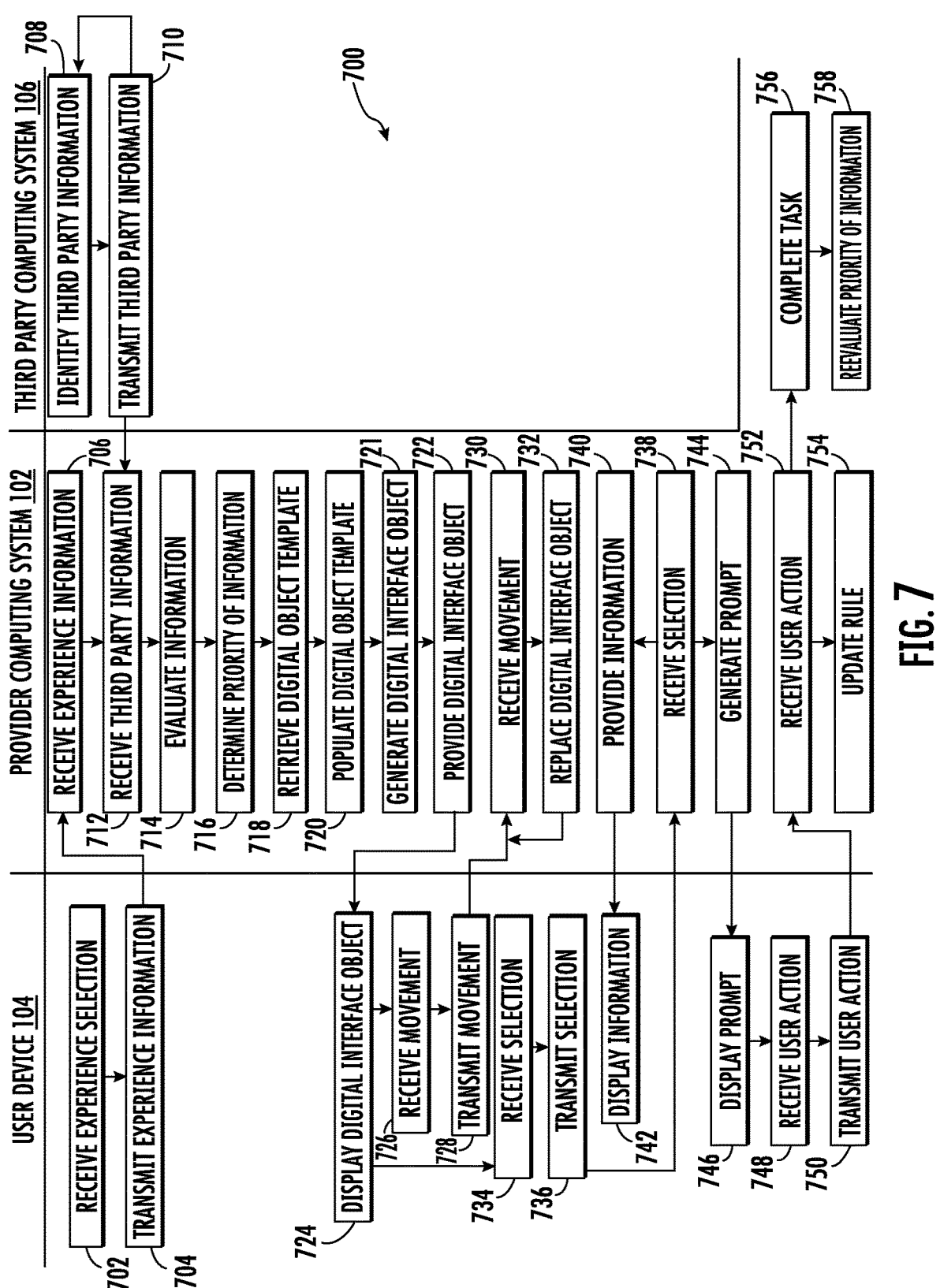
FIG. 7 is another flowchart of a process for providing a contextual digital interface object, according to some embodiments.

Referring now to FIG. 7, a process 700 of providing a contextual digital interface object is shown, according to an exemplary embodiment. Process 700 may be performed by a contextual digital interface object production system 100. Process 700 may include receiving, by a user device 104, a selection of an experience (step 702), transmitting, by the user device 104, experience information associated with the experience to a provider computing system 102 (step 704), and receiving, by a provider computing system, the experience information (step 706).

Process 700 may include identifying, by a third party computing system 106, third party information (step 708), transmitting, by the third party computing system 106, the third party information to the provider computing system 102 (step 710), and receiving, by the provider computing system 102, the third party information (step 712). The third party information may include, for example, weather conditions, health safety concerns, disaster warnings, etc. Steps 708-712 may be repeated as necessary upon identification of new or updated third party information.

Process 700 may include evaluating, by the provider computing system 102, the received experience information (e.g., experience information and third party information)

(step 714), determining, by the provider computing system 102, a priority of the received information, or a subset thereof (step 716), retrieving, by the provider computing system 102, one or more digital object templates 206 based on the prioritized information (step 718), populating, by the provider computing system 102, the one or more digital object templates 206 with corresponding experience information (step 720), generating, by the provider computing system 102, one or more contextual digital interface objects (step 721), providing, by the provider computing system 102, the one or more contextual digital interface objects 402 to the user device 104 (step 722), displaying, by the user device 104, the one or more contextual digital interface objects 402 (step 724).

Process 700 may include receiving, by the user device 104, an indication of a movement of a contextual digital interface object (step 726), transmitting, by the user device 104, the indication of the movement to the provider computing system 102 (step 728), receiving, by the provider computing system 102, the indication of the movement (step 730), and responsive to receiving the indication of the movement, replacing, by the provider computing system 102, the contextual digital interface object 402 with a second contextual digital interface object 402 (step 732).

Process 700 may include receiving, by the user device 104, an indication of a selection of a selectable feature (e.g., action item 306) of the contextual digital interface object 402 (step 734), transmitting, by the user device 104, the indication of the selection to the provider computing system 102 (step 736), and receiving, by the provider computing system 102, the indication of the selection (step 738). Responsive to receiving the indication of the selection, process 700 may include providing, by the provider computing system 102, information to the user device 104 associated with the selection (step 740), and displaying, by the user device 104, the information via a graphical user interface of the user device 104 (step 742).

Responsive to receiving the indication of the selection, process 700 may include generating, by the provider computing system 102, a prompt to receive information (e.g., authentication credentials, payment information, etc.) from a user (step 744), displaying, by the user device 104, the prompt on a graphical user interface of the user device 104 (step 746), receiving, by the user device 104, a user action based on the prompt (step 748), transmitting, by the user device 104, the user action to the provider computing system 102 (step 750), receiving, by the provider computing system 102, the user action (step 752), updating, by the provider computing system 102, a digital object analysis rule based on the user action (step 754), facilitating, by the provider computing system 102, completion of a task (step 756), and responsive to completing the task, reevaluating, by the provider computing system 102, the priority of the information (step 758).

Figure 8:
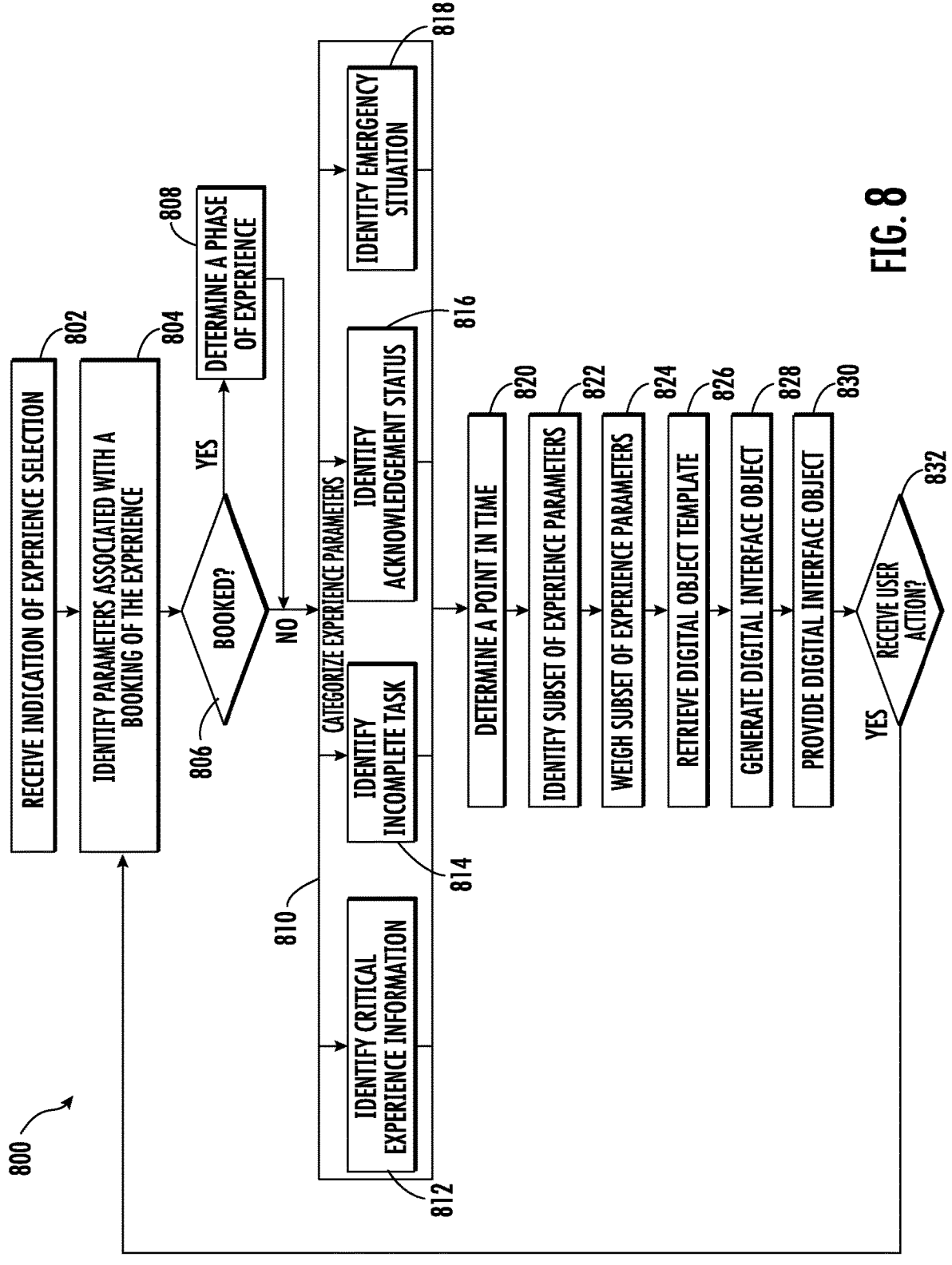
FIG. 8 is still another flowchart of a process for providing a contextual digital interface object, according to some embodiments.

Referring now to FIG. 8, with the above in mind, an example process 800 to determine and generate contextual digital interface objects may be described as follows. While process 800 is described as being performed via a provider computing system 102, some or all of the steps may also be performed by other components of the system 100 (e.g., the user device 104). Process 800 may include receiving, by a provider computing system 102, an indication of an experience selection (step 802) and identifying, by the provider computing system 102, parameters associated with a booking of an experience (step 804). The identification of the parameters associated with the booking of the experience may include receiving experience information. The experience information may be any information associated with the experience. The experience information may include third party information that is associated with the experience that is received from a third party.

Process 800 may include determining, by the provider computing system 102, a status of a booking (e.g., booked, pending, pending cancellation, cancelled) (step 806), determining, by the provider computing system 102, a phase of the experience (e.g., time prior to experience, during the experience, or after the experience) (step 808), and categorizing, by the provider computing system 102, the experience parameter (step 810). Categorizing the experience parameter may include, for example, identifying, by the provider computing system 102, critical experience information (e.g., date of check in) (step 812), identifying, by the provider computing system 102, an incomplete task (e.g., outstanding payment) (step 814), identifying, by the provider computing system 102, an acknowledgement status (e.g., cancellation request is still awaiting approval) (step 816), and identifying, by the provider computing system 102, an emergency situation (e.g., storm conditions at location of experience) (step 818).

Process 800 may include determining, by the provider computing system 102, a point in time (step 820). The point in time may be contextual information. Based on the point in time, process 800 may include identifying, by the provider computing system 102, a subset of the experience parameters (step 822). The subset of the experience parameters may be a subset of the received experience information that the provider computing system 102 determines is relevant to a user based on the determined point in time. Process 800 may include weighing, by the provider computing system 102, the subset of the experience parameters to determine a priority of the experience parameters (step 824). The priority of the experience parameters may be based, at least partially, on the contextual information. The provider computing system 102 may apply various rules (e.g., digital object analysis rules 208) to determine the priority of the experience parameters. Process 800 may include retrieving, by the provider computing system 102, one or more digital object templates 206 (step 826). The retrieved digital object templates 206 may be from a limited number of digital object templates 206). The retrieved digital object templates 206 may be based on the priority of the experience parameters. The digital object templates 206 may be populated, by the provider computing system 102, with corresponding experience parameters (or information associated therewith). Process 800 may include generating, by the provider computing system 102, a contextual digital interface object 402 (step 828). The contextual digital interface object 402 may include the digital object template 206 and the corresponding experience parameter.

The weighing/prioritizing of the subset of experience parameters (step 824) based on contextual information may further be explained as follows. In the example shown, the experience parameters include critical experience information 812 (e.g., date of experience, time of experience, duration of experience, location of experience, items to bring or not bring to the experience, entry codes, etc.), incomplete tasks 814, acknowledgement statuses 816, and emergency situations 818. It should be understood that this representation is exemplary, such that other embodiments may utilize different, more, and/or less experience parameters. The contextual information may include time (e.g., relative time or absolute time), location (e.g., location of a user, experience, etc.), emergency situations (e.g., extreme weather, health issues, etc.), and/or content changes (e.g., location of an experience has changed, start time of an event has been delayed, etc.), among others. The contextual information may be received, identified, and/or determined by the provider computing system 102 or the user client application 128 of the user device 104 (e.g., provider computing system 102 may determine there are two weeks until the experience begins or that a location of the experience has changed). Additionally, the contextual information may be received from a third party (e.g., provider computing system 102 may receive information regarding a hurricane from a third party computing system 106). One or more systems or devices disclosed herein (e.g., the provider computing system 102, user device 104 via the user client application 128) may weigh the subset of the experience parameters by applying predetermined weights to each of the experience parameters based on, or as a function of, the contextual information.

A$_x$=weight pX=experience parameter $$\text{Compare } \{A_{1_{CI}}[p1] \text{ to } A_{2_{CI}}[p2] \text{ to } \ldots A_{n_{CI}}[pN]\} \text{ as}$$
$$f(\text{contextual information}) \tag{1}$$

Using the Equation (1) above, a first weight (a1) may be applied to or associated with a first experience parameter (P$_1$), a second weight (a2) may be applied to a second experience parameter (P$_2$), and so on until experience parameter, pN, that is associated with weight an. Thus, each parameter has an associated weight. It should be understood that the number of experience parameters and, in turn, weights is highly configurable. The weight values may be predefined numerical values that are stored in the provider computing system 102 (or, the user device if included in the user client application). The weight values are shown to be a function of the received and/or determined contextual information. The provider computing system 102, for example, may retrieve the weights from a database (e.g., provider database 109) based on the contextual information and associate the weights with the respective experience parameter. In operation and as described herein, the provider computing system 102 can prioritize the experience parameters based on the associated weights. For example, an experience parameter with the greatest weight may be ranked first or highest (e.g., most important), an experience parameter with the second greatest weight may be ranked second or second highest (e.g., second most important), and an experience parameter with the lowest weight may be ranked last or lowest (e.g., least important). Based on the foregoing, a few examples are as follows:

p1=critical experience information p2=incomplete task p3=acknowledgement status p4=emergency situation A$_x$=weight $$\text{Compare } \{A_{1_t}[p1] \text{ to } A_{2_t}[p2] \text{ to } A_{3_t}[p3] \text{ to } A_{4_t}[p4]\} \text{ as}$$
$$f(\text{time}) \tag{2}$$

In a first example when the contextual information is "time" and with reference to Equation (2), which is a modified version of Equation (1), the provider computing system 102 may retrieve weights A$_1$-A$_4$ for a determined "time" for each of the four experience parameters. Being predefined values, this enables quick retrieval and quick processing. The weights A$_1$-A$_4$ are predefined according to the role that time has with each of these experience parameters. For example, at a first time (e.g., five months) prior to a start of an experience, the order of the weights may be A3 (e.g., awaiting host response, which is an acknowledgement status, p3) is greater than A2 (e.g., outstanding final payment due, which is an incomplete task, p2) that is greater than A4 (e.g., hurricane watch at a location of the experience, which is an emergency situation, p4) that is greater than A1 (e.g., need to wear a mask during the experience which is critical experience information, p1) (e.g., A3=0.7, A2=0.5, A4=0.4, and A1=0.1). In other words and as such, the provider computing system 102 may prioritize an acknowledgement status (p3) higher than an incomplete task (p2), prioritize the incomplete task higher than an emergency situation (p4), and prioritize the emergency situation higher than critical experience information (p1). However, at a different time, the provider computing system 102 may determine a different priority order. For example, at a second time closer to the start of the experience (e.g., within two weeks), the order of the weights may be A4 is greater than A1 that is greater than A3 that is greater than A2 because each weight has a different predetermined value relative to the first weight values (e.g., A4=0.9, A1=0.8, A3=0.4, A2=0.1). As such, the provider computing system may prioritize an emergency situation higher than critical experience information, prioritize the critical experience information higher than an acknowledgement status, and prioritize the acknowledgement status higher than an incomplete task.

$$\text{Compare } \{A_{1_l}[p1] \text{ to } A_{2_l}[p2] \text{ to } A_{3_l}[p3] \text{ to } A_{4_l}[p4]\} \text{ as } f(\text{location}) \quad (3)$$

As another example and when the contextual information is "location" and with reference to Equation (3), which is a modified version of Equation (1) that reflects location information as the contextual information and sticking with the same four experience parameters, the provider computing system 102 may retrieve weights $A_1$-$A_4$ for a received or determined "location." The weights $A_1$-$A_4$ are predefined according to the role of location in the prioritization of the experience parameters. The weights $A_1$-$A_4$ may dynamically change based on a location of the user relative to the experience location. For example, when a user is a first distance away from a location of an experience, the order of the weights may be A4 (e.g., infection outbreak, p4) is greater than A2 (e.g., remote check in, p2) that is greater than A3 (e.g., unread message from host, p3), which is greater than A1 (e.g., rental property access code, p2). However, when a user is within a second distance closer to the location than the first distance, the order of the weights may be A1 is greater than A4 that is greater than A2 that is greater than A3.

$$\text{Compare } \{A_{1_{lt}}[p1] \text{ to } A_{2_{lt}}[p2] \text{ to } A_{3_{lt}}[p3] \text{ to } A_{4_{lt}}[p4]\} \text{ as } f(\text{location and time}) \quad (4)$$

When the contextual information is "time and location" and with reference to Equation (4) above, which is a modified version of Equation (1) that reflects location and time information as the contextual information and sticking with the same four experience parameters above, the provider computing system 102 may retrieve weights $A_1$-$A_4$ for a determined or received "location" and "time." The weights $A_1$-$A_4$ are predefined according to the role of time and location in the prioritization of the experience parameters. In this way, the weights, $A_1$-$A_4$, may change based on the time and/or location. For example, when a user is 10 miles away from a location of an experience and two weeks prior to the experience, the order of the weights may be A2 (e.g., outstanding final payment, p2) is greater than A4 (e.g., flood warning, p4) that is greater than A3 (e.g., unread message from experience coordinator, p3), which is greater than A1 (e.g., directions to the experience, p1). However, when a user is within 200 feet from the location of the experience on the start date of the experience, the order of the weights may be A1 is greater than A4 that is greater than A2, which is greater than A3. However, if the user were 100 miles away from the location of the experience, the weight of the flood warning (A4) may be less than A3 and/or A1. If the time were the day of the experience, the weight of the flood warning and the weight of the directions to the experience may be greater than the weights of an outstanding payment (may be completed at this point) and an unread message from the experience coordinator.

$$\text{Compare } \{A_{1_d}[p1] \text{ to } A_{2_d}[p2] \text{ to } A_{3_d}[p3] \text{ to } A_{4_d}[p4]\} \text{ as } f(\text{dynamic information}) \quad (5)$$

When the contextual information is "dynamic information" (e.g., weather, public health emergencies, traffic information, etc.) and with reference to Equation (5) above, which is a modified version of Equation (1) that reflects the dynamic information as the contextual information and sticking with the same four experience parameters above, the provider computing system 102 may retrieve weights for $A_1$-$A_4$ for "dynamic information." The weights $A_1$-$A_4$ are predefined according to the role that dynamic information is defined to play in the prioritization of the experience parameters. For example, when the dynamic information is determined to be severe (e.g., severe weather or health update which are predefined to be "severe"), the order of the weights may be A4 (e.g., sever storm warning, p4) is greater than A1 (e.g., experience is delayed, p1) that is greater than A3 (e.g., unread update from host of experience, p3) that is greater than A2 (e.g., download tickets, p2). When the dynamic information is determined to be mild (e.g., predefined "mild" designations, such as weather information indicating light rain), the order of the weights may be A2 is greater than A3 that is greater than A1 that is greater than A4.

Similarly, when there are multiple experience parameters within the same category of parameter (e.g., multiple critical experience information parameters), predetermined weights can be applied to the multiple various experience parameters. For example, the weights may be based on the content of the parameter. For example, a critical experience information parameter indicative of what a user is required to bring to an experience may have a predetermined weight that is greater than a critical experience information parameter indicative of a location of the experience. The weights of the experiences parameters within the categories may also be based on the contextual information.

The weights may also be updated based on user preferences. For example, a user may, via the user client application 128, provide a weight for a specific experience parameter or a category of experience parameter. In some embodiments, the system (e.g., the provider computing system 102 or the user device 104 via the user client application 128) may update the weights based on prior user actions. For example, the provider computing system 102 may determine that the user has paid final payments for previous experiences one week prior to the deadline. As such, the provider computing system 102 may update a weight for completing a final payment for the experience to be greater when it is one week prior to the payment due date rather than when it is one month prior to the due date.

The provider computing system 102 may retrieve the appropriate weights based on the contextual information and may apply or associate the weights with the respective experience parameter. The provider computing system 102 may determine the priority of the experience parameters based on the associated weights.

Process 800 may include providing, by the provider computing system 102, the one or more contextual digital interface objects 402 to a user device 104 (step 830). The contextual digital interface objects 402 can be displayed to a user via the user device 104. The contextual digital interface objects 402 may be displayed according to the priority of the corresponding experience information. For example, a contextual digital interface object 402 with corresponding experience information that is ranked first in the priority, may be the first contextual digital interface object 402 displayed on the user device 104. A user may provide a user action to swipe, scroll, or otherwise move through a plurality of contextual digital interface objects 402 via a user interface of the user device 104. Process 800 may include determining, by the provider computing system 102, whether a user action is received (step 832). For example, the provider computing system 102 may determine when a user indicates to move a contextual digital interface object 402 or select an action item 306 of the contextual digital interface object 402. When a user action is received, process 800 may include returning to step 804 to identify any change in the experience parameters and follow the process 800 to provide new or additional contextual digital interface objects 402 if the experience parameters and/or contextual information has changed.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method, comprising:

receiving, by one or more processors, experience information associated with an experience;

evaluating, by the one or more processors, the experience information based on contextual information associated with the experience, wherein the contextual information includes a combination of a user's location, a relative time prior to or during the experience, and location-based data corresponding to a location of the experience;

determining, by the one or more processors, a priority of the experience information based on the evaluation of the combination of the contextual information;

retrieving, by the one or more processors, a digital object template from a limited number of digital object templates based on the determined priority of the experience information;

populating, by the one or more processors, the retrieved digital object template with corresponding experience information to generate a contextual digital interface object; and providing, by the one or more processors, the contextual digital interface object on a graphical user interface of a user device, the contextual digital interface object comprising a selectable feature based on the corresponding experience information.

2. The method of claim 1, further comprising:

receiving, by the one or more processors, third party information from a third party computing system associated with a third party relative to the one or more processors, wherein the contextual information includes the third party information from the third party computing system.

3. The method of claim 1, wherein the selectable feature is associated with a task associated with the experience, and wherein the method further comprises:

receiving, by the one or more processors, an indication of a selection of the selectable feature;

generating, by the one or more processors, a prompt to receive at least one authentication credential specific to the task;

receiving, by the one or more processors, the at least one authentication credential via the graphical user interface of the user device;

responsive to receiving the at least one authentication credential, enabling, by the one or more processors, a completion of the task; and responsive to the completion of the task, reevaluating, by the one or more processors, the experience information to determine a new priority of the experience information.

4. The method of claim 1, wherein the contextual digital interface object is a first contextual digital interface object, the method comprising:

receiving, by the one or more processors, an indication of a moving of the first contextual digital interface object; and responsive to receiving the indication of the moving of the first contextual digital interface object, replacing, by the one or more processors, the first contextual digital interface object on the graphical user interface with a second contextual digital interface object, the second contextual digital interface object based on the determined priority of the experience information.

5. The method of claim 1, further comprising:

applying, by the one or more processors, a rule to the experience information to determine the priority of the experience information;

receiving, by the one or more processors, an indication of an action of a user;

updating, by the one or more processors, the rule based on the action of the user; and storing, by the one or more processors, the updated rule with a user account associated with the user.

6. The method of claim 1, further comprising:

retrieving, by the one or more processors, a plurality of digital object templates of the limited number of digital object templates based on the determined priority of the experience information;

populating, by the one or more processors, the plurality of digital object templates with corresponding experience information to generate a plurality of contextual digital interface objects; and providing, by the one or more processors, the plurality of contextual digital interface objects to the user device in an order according to the determined priority of the experience information.

7. The method of claim 6, wherein the plurality of contextual digital interface objects comprises a first contextual digital interface object and a second contextual digital interface object, and wherein the first contextual digital interface object is visible via the graphical user interface of the user device and the second contextual digital interface object is only partially visible via the graphical user interface of the user device.

8. The method of claim 1, further comprising:

determining, by the one or more processors, the priority of the experience information based on a first time instant relative to the experience; and adjusting, by the one or more processors, the priority of the experience information based on a second time instant relative to the experience, wherein the first time instant is a moment in time before the experience, and wherein the second time instant is closer to a start of the experience than the first time instant.

9. A computing system for providing at least one contextual digital interface object, the computing system comprising:

at least one memory device structured to store information regarding an experience; and at least one processor coupled to the at least one memory device and structured to:

receive experience information associated with the experience;

evaluate the experience information based on contextual information associated with the experience, wherein the contextual information includes a combination of a user's location, a relative time prior to or during the experience, and location-based data corresponding to a location of the experience;

determine a priority of the experience information based on the evaluation of the combination of contextual information;

retrieve a digital object template from a limited number of digital object templates based on the determined priority of the experience information;

populate the retrieved digital object template with corresponding experience information to generate a contextual digital interface object; and provide the contextual digital interface object on a graphical user interface of a user device, the contextual digital interface object comprising a selectable feature based on the corresponding experience information.

10. The computing system of claim 9, wherein the at least one processor is further structured to:

receive third party information from a third party computing system associated with a third party relative to the at least one processor, wherein the contextual information includes the third party information from the third party computing system.

11. The computing system of claim 9, wherein the selectable feature is associated with a task associated with the experience, wherein the at least one processor is further structured to:

receive an indication of a selection of the selectable feature;

generate a prompt to receive at least one authentication credential specific to the task;

receive the at least one authentication credential via the graphical user interface of the user device;

responsive to receiving the at least one authentication credential, enable a completion of the task; and responsive to the completion of the task, reevaluate the experience information to determine a new priority of the experience information.

12. The computing system of claim 9, wherein the contextual digital interface object is a first contextual digital interface object, wherein the at least one processor is further structured to:

receive an indication of a moving of the first contextual digital interface object; and responsive to receipt of the indication of the moving of the first contextual digital interface object, replace the first contextual digital interface object on the graphical user interface with a second contextual digital interface object, the second contextual digital interface object based on the determined priority of the experience information.

13. The computing system of claim 9, wherein the at least one processor is further structured to:

apply a rule to the experience information to determine the priority of the experience information;

receive an indication of an action of a user;

update the rule based on the action of the user; and store the updated rule with a user account associated with the user.

14. The computing system of claim 9, wherein the at least one processor if further structured to:

retrieve a plurality of digital object templates of the limited number of digital object templates based on the determined priority of the experience information, the plurality of digital object templates comprising the digital object template;

populate the plurality of digital object templates with corresponding experience information to generate a plurality of contextual digital interface objects; and provide the plurality of contextual digital interface objects to the user device according to the determined priority of the information.

15. The computing system of claim 14, wherein the plurality of contextual digital interface objects comprises a first contextual digital interface object and a second contextual digital interface object, wherein the first contextual digital interface object is fully visible via the graphical user interface of the user device and the second contextual digital interface object is only partially visible via the graphical user interface of the user device.

16. The computing system of claim 9, wherein the at least one processor is further structured to:

determine the priority of the experience information based on a first time instant relative to the experience; and adjust the priority of the experience information based on a second time instant relative to the experience, and wherein the second time instant is closer to a start of the experience than the first time instant.

17. A non-transitory computer-readable media having computer-executable instructions embodied therein that, when executed by at least one processor of a provider computing system, cause the provider computing system to perform operations comprising:

receiving experience information associated with an experience;

evaluating the experience information based on contextual information associated with the experience, wherein the contextual information includes a combination of a user's location, a relative time prior to or during the experience, and location-based data corresponding to a location of the experience;

determining a priority of the experience information based on the evaluation of the combination of contextual information;

retrieving a digital object template from a limited number of digital object templates based on the determined priority of the experience information;

populating the retrieved digital object template with corresponding experience information to generate a contextual digital interface object; and providing the contextual digital interface object on a graphical user interface of a user device, the contextual digital interface object comprising a selectable feature based on the corresponding experience information.

18. The non-transitory computer-readable media of claim 17, wherein the operations further comprise:

receiving third party information from a third party computing system associated with a third party relative to the at least one processor, wherein the contextual information includes the third party information from the third party computing system.

19. The non-transitory computer-readable media of claim 17, wherein the selectable feature is associated with a task associated with the experience, wherein the operations further comprise:

receiving an indication of a selection of the selectable feature;

generating a prompt to receive at least one authentication credential specific to the task;

receiving the at least one authentication credential via the graphical user interface of the user device;

responsive to receiving the at least one authentication credential, enabling a completion of the task; and responsive to the completion of the task, reevaluating the experience information to determine a new priority of the experience information.

20. The non-transitory computer-readable media of claim 17, wherein the contextual digital interface object is a first contextual digital interface object, the operations further comprise:

receiving an indication of a moving of the first contextual digital interface object; and responsive to receiving the indication of the moving of the first contextual digital interface object, replacing the first contextual digital interface object on the graphical user interface with a second contextual digital interface object, the second contextual digital interface object based on the determined priority of the experience information.

* * * * *